US012665895B2

(12) United States Patent
Yong et al.

(10) Patent No.: US 12,665,895 B2
(45) Date of Patent: Jun. 23, 2026

(54) APPARATUS AND METHOD FOR PROVIDING LOGIN FUNCTION OF APPLICATION IN ELECTRONIC DEVICE

(71) Applicant: SAMSUNG ELECTRONICS CO., LTD., Suwon-si (KR)

(72) Inventors: Seokjoo Yong, Suwon-si (KR); Changjoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 18/090,290

(22) Filed: Dec. 28, 2022

(65) Prior Publication Data

US 2023/0164132 A1　May 25, 2023

Related U.S. Application Data

(63) Continuation of application No. PCT/KR2022/018622, filed on Nov. 23, 2022.

(30) Foreign Application Priority Data

Nov. 23, 2021　(KR) ........................ 10-2021-0162697
Jan. 14, 2022　(KR) ........................ 10-2022-0005787

(51) Int. Cl.
　*H04L 9/40*　　　(2022.01)
　*G06F 3/0481*　　(2022.01)
　　　　(Continued)

(52) U.S. Cl.
　CPC ........ *H04L 63/0815* (2013.01); *G06F 3/0481* (2013.01); *H04L 61/45* (2022.05); *H04L 67/02* (2013.01); *H04L 2101/604* (2022.05)

(58) Field of Classification Search
None
See application file for complete search history.

(56) References Cited

U.S. PATENT DOCUMENTS 9,450,939 B2　9/2016　Zhou et al.
9,473,505 B1　10/2016　Asano et al.
　　　　(Continued)

FOREIGN PATENT DOCUMENTS

CN　104735066 A　*　6/2015　......... H04L 63/0815
CN　106534082　　3/2017
　　　　(Continued)

OTHER PUBLICATIONS

Search Report and Written Opinion dated Mar. 2, 2023 issued in International Patent Application No. PCT/KR2022/018622.
　　　　(Continued)

*Primary Examiner* — Lashonda Jacobs-Burton
(74) *Attorney, Agent, or Firm* — Nixon & Vanderhye, P.C.

(57) ABSTRACT

Various embodiments of the disclosure provide a method of providing a login function (or a login service) of an application and an electronic device supporting the same. An electronic device according to an embodiment of the disclosure may include: a display module including a display, a memory, and a processor operatively connected to the display module and the memory. The processor may be configured to: detect a trigger for performing a login function of a first application; extract first account information used for the login function of the first application; determine whether the first account information includes second account information of a second application which can be linked to the first application; based on the second account information being included, provide the second application which is usable and the second account information in a login screen related to the first application displayed on the display module.

19 Claims, 14 Drawing Sheets

(51) Int. Cl.
    *H04L 61/45*         (2022.01)
    *H04L 67/02*         (2022.01)
    *H04L 101/604*      (2022.01)

(56)                 References Cited

U.S. PATENT DOCUMENTS

| | | | | |
|---|---|---|---|---|
| 9,832,181 | B2 * | 11/2017 | Vernal | G06F 21/41 |
| 10,778,434 | B2 | 9/2020 | Park | |
| 10,812,465 | B2 * | 10/2020 | Sun | G06F 21/31 |
| 10,972,528 | B2 | 4/2021 | Cheng et al. | |
| 11,140,145 | B1 * | 10/2021 | Sokolov | H04L 9/3213 |
| 11,238,453 | B2 * | 2/2022 | Kim | G06Q 20/40145 |
| 11,372,963 | B2 * | 6/2022 | Guo | G06F 21/33 |
| 2012/0291114 | A1 * | 11/2012 | Poliashenko | G06F 21/41 |
| | | | | 726/8 |
| 2014/0007084 | A1 * | 1/2014 | Ding | G06F 8/61 |
| | | | | 717/178 |
| 2014/0282983 | A1 * | 9/2014 | Ju | H04W 12/068 |
| | | | | 726/8 |
| 2015/0012990 | A1 * | 1/2015 | Copsey | H04L 47/803 |
| | | | | 726/7 |
| 2015/0150111 | A1 * | 5/2015 | Friedmann | H04L 63/0815 |
| | | | | 726/9 |
| 2016/0119325 | A1 * | 4/2016 | Doshi | H04L 67/56 |
| | | | | 726/7 |
| 2016/0248756 | A1 | 8/2016 | Cicchitto et al. | |
| 2016/0292020 | A1 | 10/2016 | Caron | |
| 2017/0295165 | A1 | 10/2017 | Cicchitto et al. | |
| 2018/0260086 | A1 | 9/2018 | Leme et al. | |
| 2020/0356655 | A1 * | 11/2020 | Guo | G06F 21/41 |
| 2023/0125139 | A1 * | 4/2023 | Luo | H04W 12/0431 |
| | | | | 726/4 |
| 2024/0205026 | A1 * | 6/2024 | Small | H04W 12/50 |

FOREIGN PATENT DOCUMENTS

| | | | | |
|---|---|---|---|---|
| CN | 112311795 | | 2/2021 | |
| CN | 112311795 A | * | 2/2021 | H04L 63/0815 |
| CN | 112115454 B | * | 9/2023 | G06F 21/41 |
| CN | 114666082 B | * | 9/2023 | H04L 63/08 |
| JP | H06-4532 A | | 1/1994 | |
| JP | 2020-064532 | | 4/2020 | |
| KR | 10-2005-0086106 | | 8/2005 | |
| KR | 10-2012-0067105 | | 6/2012 | |
| KR | 10-1831381 | | 4/2018 | |
| KR | 10-2019-0082168 | | 7/2019 | |
| KR | 10-2019-0121385 | | 10/2019 | |
| KR | 10-2021-0130414 | | 11/2021 | |

OTHER PUBLICATIONS

Extended Search Report dated Dec. 16, 2024 in European Patent Application No. 22899031.3.

Fraser, Josh: "Can't remember which social login method you used?", XP093229898, Retrieved from the Internet: URL:https://onlineaspect.com/2015/09/09/best-practices-for-social-logins, Sep. 9, 2015, 2 pages.

Office Action dated Jan. 14, 2026 in Indian Application No. 202417039206 with English-language translation.

\* cited by examiner

Figure 8:
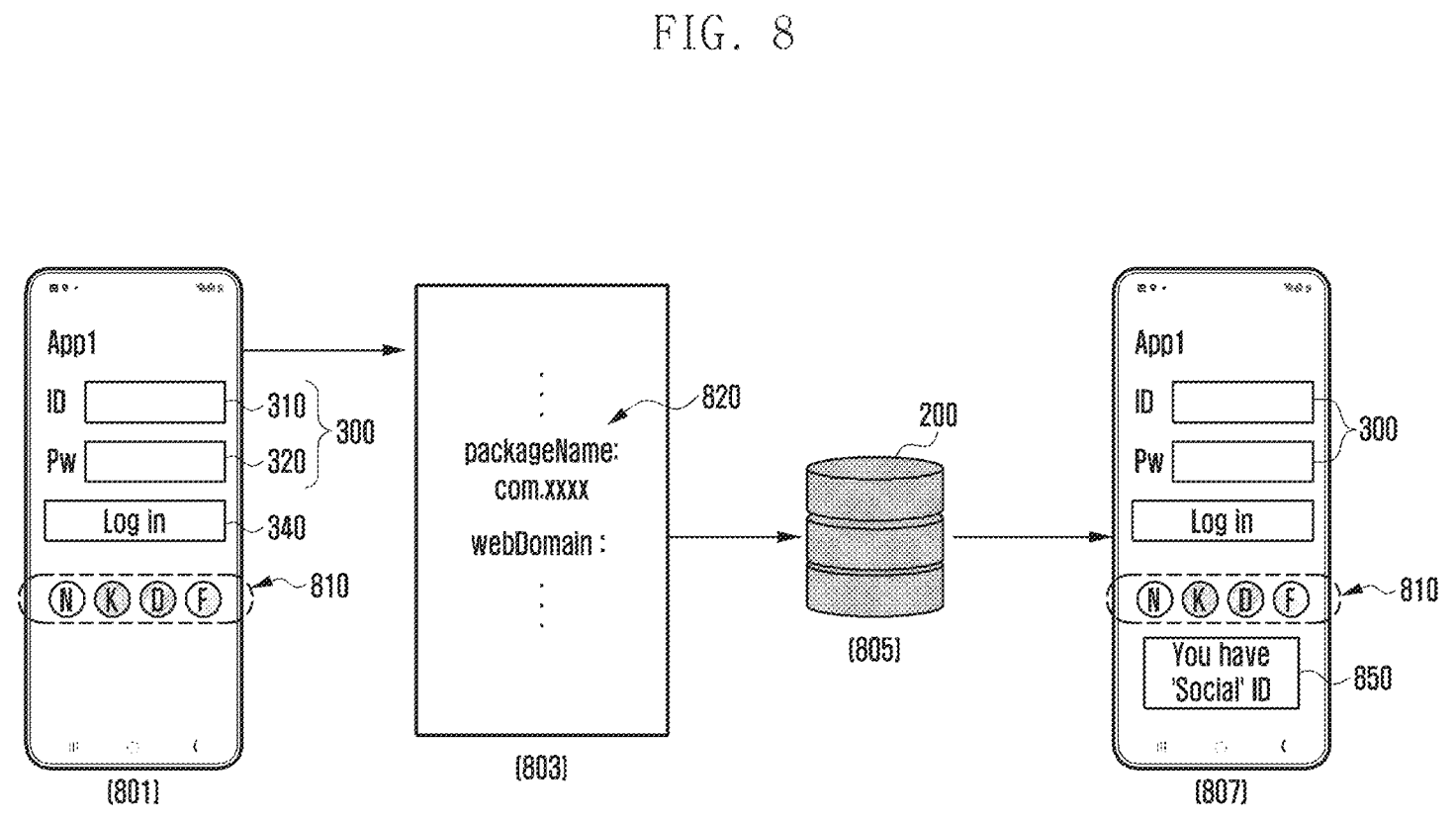

App1

ID

Pw

Log in

N K D F  — 810

[801]

310 320 340 — 300 packageName:
com.xxx webDomain:

820

[803]

200

[805]

App1

ID

Pw

Log in

N K D F  — 810

You have
'Social' ID  — 850

APPARATUS AND METHOD FOR PROVIDING LOGIN FUNCTION OF APPLICATION IN ELECTRONIC DEVICE

CROSS-REFERENCE TO RELATED APPLICATIONS

This application is a continuation of International Application No. PCT/KR2022/018622 designating the United States filed on Nov. 23, 2022, in the Korean Intellectual Property Receiving Office and claiming priority to Korean Patent Application No. 10-2021-0162697, filed on Nov. 23, 2021, in the Korean Intellectual Property Office, and to Korean Patent Application No. 10-2022-0005787, filed on Jan. 14, 2022, in the Korean Intellectual Property Office, the disclosures of all of which are incorporated by reference herein in their entireties.

BACKGROUND

Field

The disclosure relates to a method and an apparatus for providing a login function of an application in an electronic device.

Description of Related Art

With the development of digital technologies, various types of electronic devices such as mobile communication terminals, personal digital assistants (PDAs), electronic organizers, smart phones, tablet personal computers (PCs), wearable devices, and/or laptop PCs have become widely used. A hardware part and/or a software part of the electronic device is continuously developed to support and expand functions.

An application of the electronic device provides an automatic completion function of account information (for example, an identification (ID)) and/or a password (PW) for a login function or a login. For example, when account information for the application is configured, the electronic device may recommend pre-stored account information (for example, an ID and a password) to the user when the user attempts the login in the corresponding application. The electronic device may recommend automatic login account information corresponding to the application with reference to a unique value (for example, a package name (packageName)) or a web domain (webDomain) address of the application for identifying the corresponding application when account information is recommended.

Recently, an electronic device provides a login function (or a login service) through links with various types of social applications (for example, Google, Facebook, Twitter, Apple, Naver, and/or Kakao) in various applications. However, the login function provided by the electronic device may be a scheme of, when the login is performed in an application, recommending account information corresponding to the case in which at least one item matches with simple reference to a unique value and a web domain address of the application.

Accordingly, when there is no matching item even though a login function (or a social login function) by a social account of an actual social application is usable, account information may not be recommended, social login account information may be recommended in an account login screen of the application itself, or account information of the application itself may be recommended in the social account login screen. Further, since one application provides the login function through a link with various types of social accounts, the user may have difficulty in determining whether the corresponding application uses account information of the application itself or the linked social account. Alternatively, the user may have difficulty in remembering which type of social account is used for the login function among social accounts of various types of social applications.

SUMMARY

Embodiments of the disclosure provide a method and an apparatus for identifying a social account from account information used for the login function of the application and providing information thereon when the electronic device provides the login function (or the login service) of the application.

Embodiments of the disclosure provide a method and an apparatus for determining whether account information stored for the corresponding application is a social account and providing information on the type of a social application related to the social account when the application of the electronic device provides the login function.

Embodiments of the disclosure provide a method and an apparatus for providing information on the application using account information and the type of the login function used by the application when the electronic device provides the account information.

An electronic device according to various example embodiments of the disclosure may include: a display module including a display, a memory, and a processor operatively connected to the display module and the memory. According to an embodiment, the processor may be configured to detect a trigger for executing a login function in a first application. The processor may be configured to extract first account information used for the login function of the first application. The processor may be configured to determine whether the extracted first account information includes second account information of a second application which can be linked thereto. Based on the second account information being included, the processor may be configured to provide the second application which is usable and visual objects related to the second account information in a login screen related to the first application displayed on the display module.

A method of operating an electronic device according to various example embodiments of the disclosure may include: detecting a trigger for executing a login function in a first application, extracting first account information used for the login function of the first application, determining whether the extracted first account information includes second account information of a second application which can be linked thereto, and, based on the second account information being included, providing the second application which is usable and visual objects related to the second account information in a login screen related to the first application displayed on a display module.

In order to address the above problem, various example embodiments of the disclosure may include a computer-readable recording medium that has stored thereon a program causing a processor to perform the method.

An additional range of applicability of the disclosure may become clear from the following detailed description. However, since various modifications and changes within the idea and scope of the disclosure may be clearly understood by those skilled in the art, the detailed description and various example embodiments of the disclosure should be understood as non-limiting examples.

According to various example embodiments, an electronic device and a method of operating the same according to various embodiments of the disclosure, it is possible to identify a social account from account information used for a login function of an application and intuitively provide information thereon when the login function (or a login service) of the application is provided. According to various example embodiments of the disclosure, it is possible to identify a social account linked to the application when the electronic device provides the login function of the application.

According to various example embodiments of the disclosure, when a login function of the application is provided, it is possible to determine whether account information stored for the corresponding application is a social account and intuitively provide information on the type of a social application related to the social account, so as to allow the user to easily recognize the social login function.

According to various example embodiments of the disclosure, when the electronic device provides account information, it is possible to intuitively provide information on the application using the account information and the type of a login function used by the application through a predetermined object and/or a message.

Further, various effects directly or indirectly detected through the disclosure can be provided.

BRIEF DESCRIPTION OF THE DRAWINGS

In connection with the description of drawings, the same or similar reference numerals can be used for the same or similar elements. Further, the above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

FIG. 8 is a diagram illustrating an example of providing a login function in the electronic device according to various embodiments;

FIG. 9 is a diagram illustrating an example of providing a login function in the electronic device according to various embodiments;

DETAILED DESCRIPTION

Figure 1:
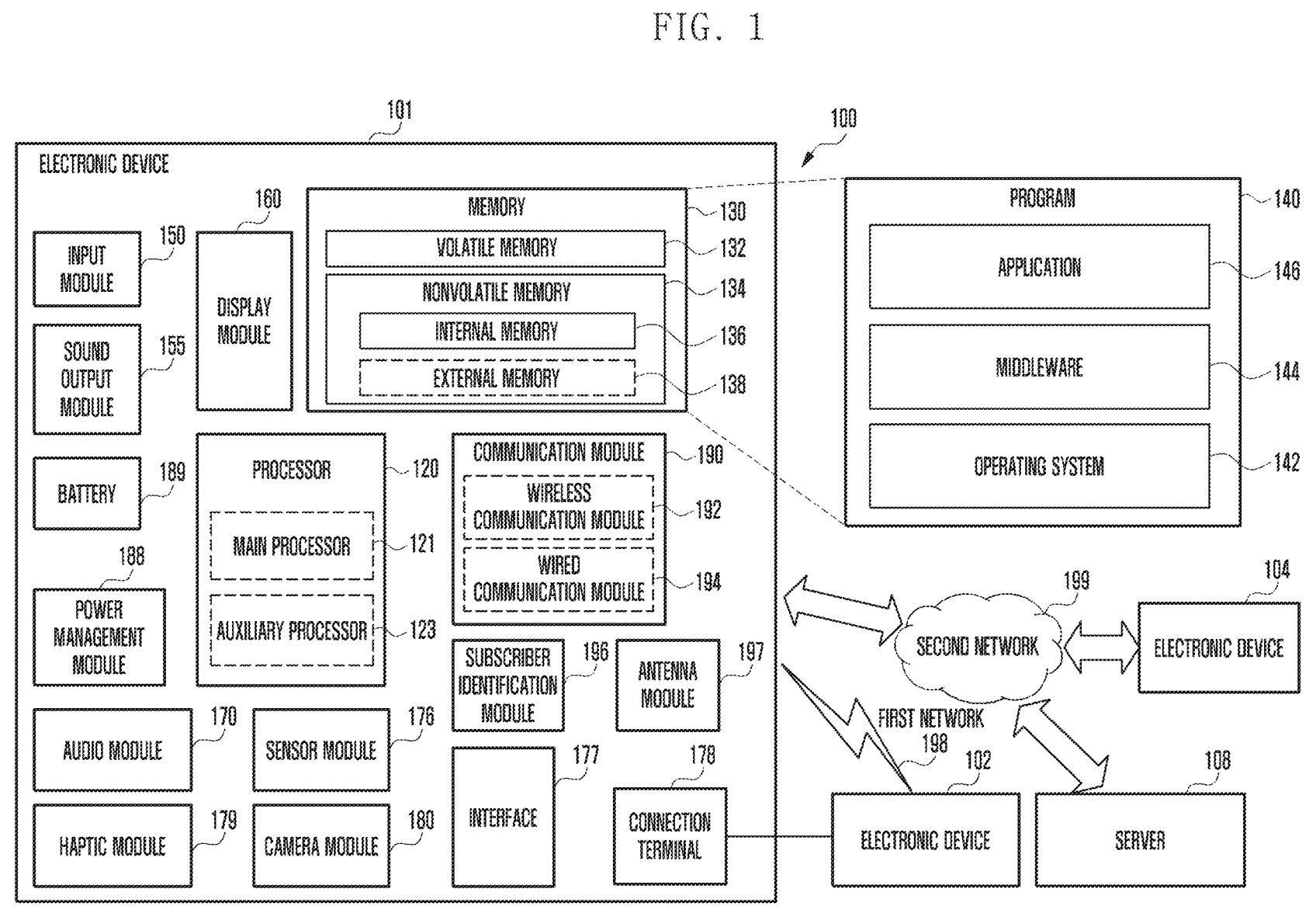
Figure 2:
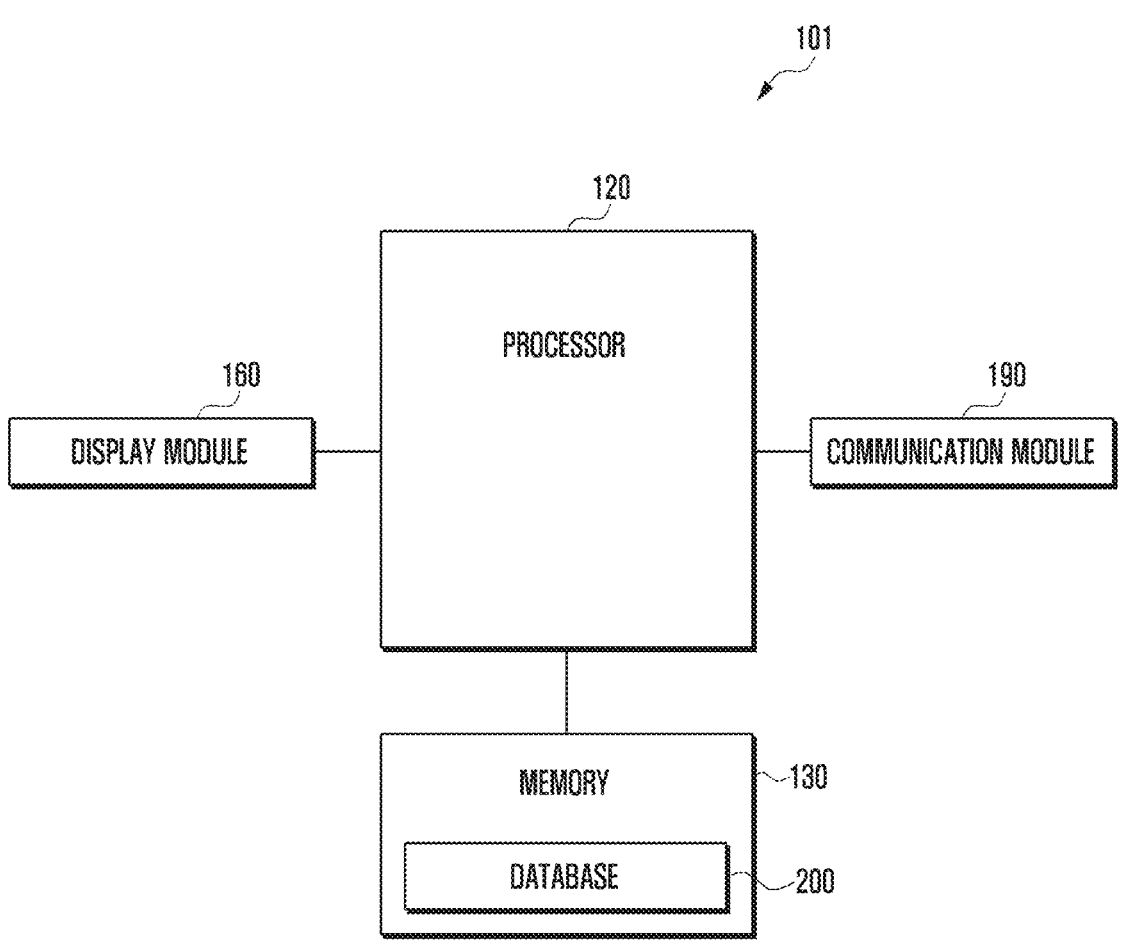
FIG. 2 is a block diagram illustrating an example configuration of an electronic device according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2 is a block diagram illustrating an example configuration of an electronic device according to various embodiments.

Referring to FIG. 2, the electronic device 101 according to an embodiment may include the communication module (e.g., including communication circuitry) 190, the display module (e.g., including a display) 160, the memory 130, and/or the processor (e.g., including processing circuitry) 120.

The communication module 190 may include various communication circuitry and support a legacy network (for example, a 3G network and/or a 4G network), a 5G network, an out of band (OOB), and/or a next-generation communication technology (for example, a new radio (NR) technology). According to an embodiment, the communication module 190 may correspond to the wireless communication module 192 as illustrated in FIG. 1. According to an embodiment, the electronic device 101 may communicate with an external device (for example, the server 108 and/or another electronic device 102 or 104 of FIG. 1) through the network using the communication module 190. According to an embodiment, the electronic device 101 may receive information related to an application (for example, reference information described below) from an external device through the communication module 190.

The display module 160 may include a display and visually provide various pieces of information to the outside (for example, the user) of the electronic device 101. According to an embodiment, the display module 160 may include a touch detection circuit (or a touch sensor) (not shown), a pressure sensor capable of measuring the intensity of a touch, and/or a touch panel (for example, a digitizer) capable of detecting a stylus pen in a magnetic type. According to an embodiment, the display module 160 may detect a touch input and/or a hovering input (or a proximity input) by measuring a change in a signal (for example, a voltage, an amount of light, resistance, an electromagnetic signal, and/or an amount of charge) for a predetermined location of the display module 160 on the basis of a touch detection circuit, a pressure sensor, and/or a touch panel.

According to an embodiment, the display module 160 may include a liquid crystal display (LCD), an organic light emitted diode (OLED), an active matrix organic light emitted diode (AMOLED), or the like. According to various embodiments, the display module 160 may include a flexible display.

The display module 160 may visually provide various screens related to a login function (or a login service) or an application execution screen under the control of the processor 120. In an embodiment, various screens related to the login function may include a login configuration screen, a login screen, or an account management screen. According to an embodiment, when providing the screen related to the login function, the display module 160 may provide account information (for example, application account information and/or account information of a social account) and/or various visual objects related to account information (or additional information) (for example, a guide object and/or an social login execution object).

The memory 130 may store various pieces of data used by the electronic device 101. The data may include, for example, input data or output data for an application (for example, the program 140 of FIG. 1) and commands related thereto. According to an embodiment, when executed, the memory 130 may store instructions causing the processor 120 to operate. For example, the application can be stored in the memory 130 as software (for example, the program 140 of FIG. 1) and can be executed by the processor 120. According to an embodiment, the application may be various applications for providing a login function based on a user account in the electronic device 101.

According to an embodiment, the memory 130 may include a database 200 for storing and/or providing at least one piece of account information and/or reference information related to a login function configuration of the user with respect to the application. According to an embodiment, the memory 130 may store at least one element (or module) (not shown) related to a function (or operation) for storing and/or providing account information for a login function according to various embodiments of the disclosure. For example, the memory 130 may include an account management function (for example, an account automatic completion function) which can be executed by the processor 120 in a software form (or an instruction form).

The processor 120 may include various processing circuitry and control a relevant operation for storing and/or managing at least one piece of account information (for example, an ID and a password) input by the user when the login is performed in various applications of the electronic device 101 for each application. In an embodiment, account information may include account information of the application itself (for example, first account information or general account information) and account information related to an SNS account of a social application (for example, second account information or social account information).

According to an embodiment, when the user logs in the application, the processor 120 may extract account information (for example, first account information and/or second account information) used for the login function of the corresponding application and control a relevant operation for determining whether the extracted account information includes social account information of the application and other social applications. According to an embodiment, for the application, the processor 120 may determine (or analyze) whether there is a social account which can support a social login function (or a social login service) based on account information of the social application on the basis of at least one piece of account information related to the application.

According to an embodiment, the processor 120 may operate to determine whether there is a social account on the basis of account information related to the application according to a predetermined (e.g., specified) condition. In an embodiment, the predetermined condition may include various determination conditions for identifying the social account as described below, and the electronic device 101 may identify the social account by one or a combination of the various determination conditions.

According to an embodiment, for one application, the user may log in the application on the basis of account information of the application itself or log in the application on the basis of social account information. In this case, two pieces of account information may be configured in connection with the application.

For example, for the application, two pieces of account information may have the same unique value (for example, package name and/or package signature) for identifying the application but a web domain address (or link address (for example, uniform resource identifier (URI) or uniform resource locator (URL)) connected to a login screen may include different items (for examples, items having different values of a web domain address field or items having no value).

According to an embodiment, when a web domain address corresponding to a unique value related to the application for identifying the application is different from a web domain address corresponding to a unique value of the same application pre-stored in the database 200 or there is no web domain address corresponding to a shared value of the same application, the processor 120 may determine that the application includes a social account which can support a social login function.

For example, in connection with the application, when there is an item having the same application unique value but having no web domain address, the processor 120 may determine that social information including an item having a web domain address is the social account. For example, when a first application has a unique value A and an address B corresponding to the unique value A or the unique value A and an address C (or null) corresponding to the unique value A, the processor 120 may determine that the first application includes a social account on the basis of the address B corresponding to the unique value A.

According to an embodiment, when a web domain address corresponding to the unique value of the application acquired from the application in the login screen is different from a web domain address corresponding to the same unique value stored in the database 200 or the web domain address does not exist, the processor 120 may determine that the application includes a social account which can support a social login function if there is another unique value (for example, a unique value of another application) item stored as the same web domain address in the database 200.

For example, for the first application, a first web domain address corresponding to a first unique value may be different from a second web domain address corresponding to the first unique value stored in the database 200 or there may be no second web domain address corresponding to the first unique value. In this case, the processor 120 may have the same first web domain address in the database 200 but, when there is a second unique value item of a second application which is different from the first unique value of the first application, the processor 120 may determine the corresponding first web domain address as a web domain address corresponding to the social account login screen.

For example, the first application may have the unique value A and the address B corresponding to the unique value A, which is different from an address C corresponding to the same unique value A pre-stored in the database 200 or having no web domain address, and the second application may have a unique value D different from the unique value A of the first application and the address B which is the same as the address B of the first application in the database 200. When a web domain address corresponding to an A unique value of the first application is different from a web domain address corresponding to the same A unique value stored in the database 200 or there is no corresponding web domain address, the processor 120 may identify a second application (for example, a second unique value of the second application) having the same web domain address in the database 200 and, when the second application is identified, determine that the first application includes the social account on the basis of the same web domain address of the second application.

According to an embodiment, the processor 120 may separate manage a web domain address for a social login function through communication with a separate server (for example, a cloud server), and a positive response for the social account of the corresponding web domain address is received from the server 108, determine that the application includes the social account which can support the social login function.

According to an embodiment, an operation of determining whether the social login function based on account information (for example, the social account or social account information) of the social application can be supported for the application is described below.

According to an embodiment, when the application includes social account information, the processor 120 may control a relevant operation for providing the user with available social applications and social account information thereof in the login screen.

According to an embodiment, the processor 120 may operate to store account information (for example, IDs and passwords) input by the user for each application when the login is performed in the application and, when a trigger for executing the login function is detected in the application, extract account information used for the login function of the application, determine whether the extracted account information includes social account information of a social application different from the application, and provide the user with available social applications and social account information thereof in the login screen.

According to an embodiment, the processor 120 may include an element (or a module) (not shown) for storing and/or providing account information for the login function according to various embodiments of the disclosure. For example, the processor 120 may include an account management function (for example, an account automatic completion function). According to an embodiment, the account management function may be included in the processor 120 as a hardware module (for example, circuitry) and/or implemented in software including one or more instructions which can be executed by the processor 120. For example, operations performed by the processor 120 may be stored in the memory 130 and may be performed by instructions executed by the processor 120 when performed.

In various embodiments, the instructions may include an instruction for storing account information (for example, IDs and passwords) input by the user for each application when the login is performed in the application, an instruction for detecting a trigger of performing a login function in the application, an instruction for extracting account information used for the login function of the application, an instruction for determining whether the extracted account information includes social account information of the social application which can be linked to the application, and an instruction for, when the social account information is included, performing an operation of providing the user with available social applications and social account information thereof in the login screen. According to an embodiment, the operations performed by the processor 120 may be included in a computer-readable recording medium having programs recorded therein.

Figure 3:
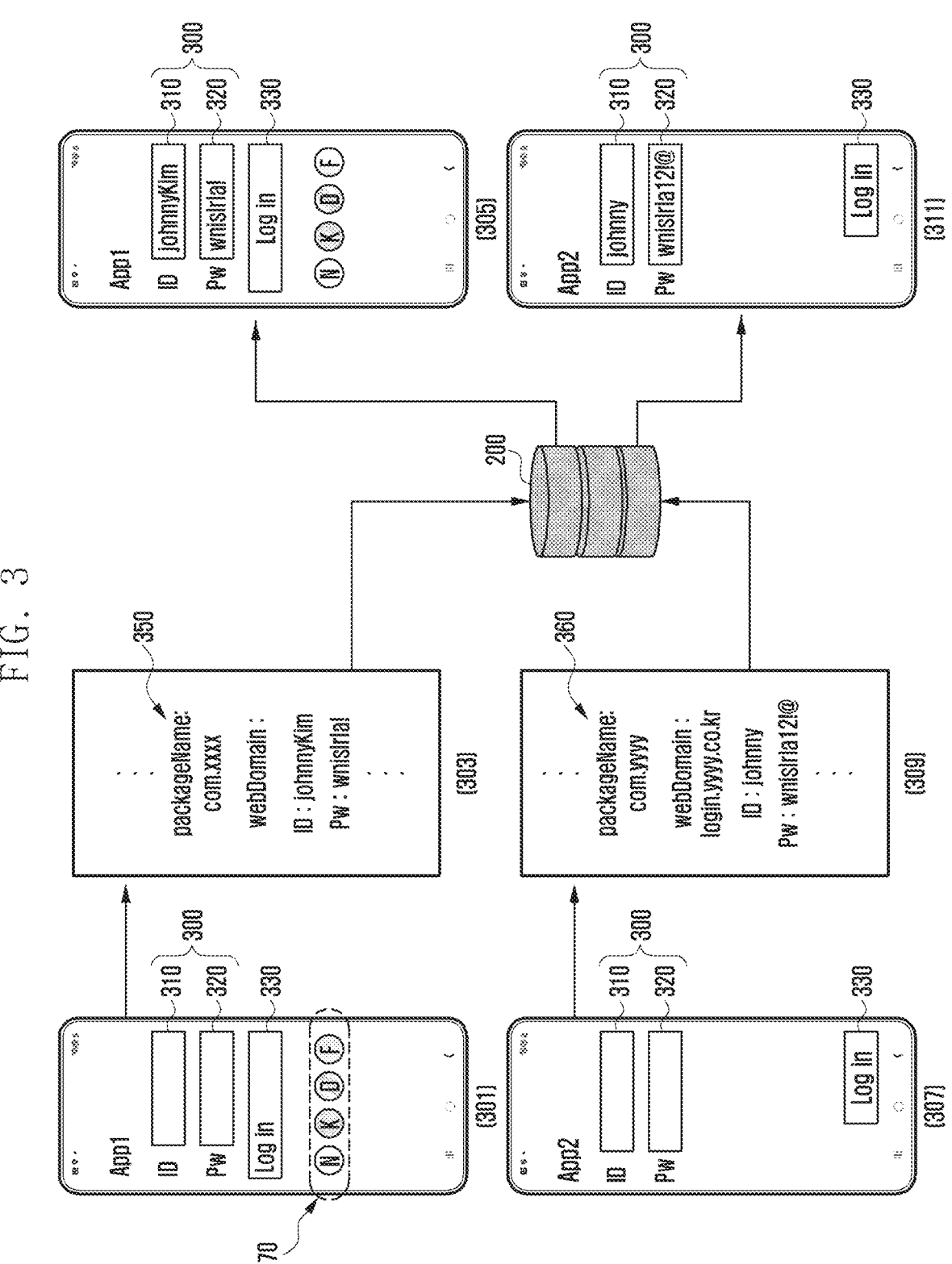
FIG. 3 is a diagram illustrating an example in which an electronic device provides an automatic completion function for account information according to various embodiments.

FIG. 3 is a diagram illustrating an example in which an electronic device provides an automatic completion function for account information according to various embodiments.

Referring to FIG. 3, reference numeral <301> may indicate an example of a login screen (or login page or view) of a first application (for example, App1) and reference numeral <307> may indicate an example of a login screen of a second application (for example, App2). In an embodiment, a login screen for each application may be different depending on a user interface provided by an application. According to an embodiment, when an application is executed according to a user request or when the executed application detects a user input for logging in the application, the electronic device 101 may display a login screen of the corresponding application through the display module 160.

When the login screen is displayed through the display module 160 of the electronic device 101 as indicated by reference numeral <301> or reference numeral <307>, the user may input account information on the basis of an account information field 300 (for example, an ID input field 310 and a password input field 320) in the login screen. In an embodiment, account information may be related to a character string designated by the user to verify the user's identity in the corresponding application. For example, the account information may include an identification (ID) and a password (PW). The user may input account information through the account information field 300 and make a request for the login based on the input account information to the electronic device 101 on the basis of selection (for example, touch) of a login button 330.

When the electronic device 101 detects a user input by the login button 330 in the login screen, the electronic device 101 may authenticate account information input into the account information field 300 and, when the input account information is normally authenticated, log in the corresponding application and display an execution screen of the logged-in application through the display module 160.

Meanwhile, the user may equally or differently configure account information for each application. For example, the user may configure first account information (for example, a first ID and a first password) through the login screen of the first application (for example, App1) as indicated by reference numeral <301> and configure second account information (for example, a second ID and a second password) through the login screen of the second application (for example, App2) as indicated by reference numeral <307>. According to an embodiment, the first account information for the first application and the second account information for the second application may include the same information or different information by the user.

When a request for configuring account information designated by the user is detected in the login screen of the application, the electronic device 101 may store account information (for example, an ID and a password) input into the account information field 300 (for example, the ID input field 310 and the password input field 320) by the user in the memory 130 of the electronic device 101 (for example, the database 200 designated to manage the account) and manage the same through the account management function (for example, the account automatic completion function) of the electronic device 101.

In an embodiment, when storing account information in the database 200, the electronic device 101 may map the account information, a unique value (for example, a package name and/or a packet signature) of the application in which the account information is configured, and/or reference information such as a web domain address and store the same as mapping information 350 and 360.

According to an embodiment, when the first account information is configured for the first application (for example, App1) as indicated by reference numeral <301>, the electronic device 101 may store first mapping information 350 for the first application in the database 200 as indicated by reference numeral <303>.

For example, the electronic device 101 may map a first package name (for example, "packageName: com.xxxx"), a first web domain address (for example, "webDomain null"), a first ID (for example, "ID: johnnyKim"), and a first password (for example, "PW: wnislrla!") and store the same in the database 200. Here, a field of the first web domain address may indicate a state in which there is no data (for example, stored value), which may be indicated as "null" for understanding.

According to an embodiment, when second account information is configured for the second application (for example, App2) as indicated by reference numeral <307>, the electronic device 101 may store second mapping information 360 for the second application in the database 200 as indicated by reference numeral <309>.

For example, the electronic device 101 may map a second package name (for example, "packageName: com.yyyy"), a second web domain address (for example, "webDomain: login.yyyy.co.kr"), a second ID (for example, "ID: johnny"), and a second password (for example, "PW: wnislrla12!@") and store the same in the database 200. In an embodiment, when there is no web domain address like the case of the first application, a field (for example, "webDomain:" field indicated by reference numeral <303>) related to the web domain address having no data may be stored in the database 200.

When account information for the application is configured, the electronic device 101 may automatically input (or automatically complete) account information (for example, the ID and the password) pre-stored in the database 200 by the account management function into the account information field 300 and provide the same to the user when user assigns the focus to the account information field 300 (for example, detects selection of the account information field 300) in the corresponding application.

When account information is automatically input into the account information field 300, the electronic device 101 may automatically input the corresponding account information into the account information field 300 with reference to reference information of the corresponding application (for example, a package name and/or a web domain address) and recommend the same to the user.

For example, for the first application indicated by reference numeral <301>, the electronic device 101 may automatically complete first account information (for example, the first ID and the first password) in the account information field 300 as indicated by reference numeral <305> with reference to first reference information (for example, the first package name and the first web domain address) and provide the same to the user. In another example, for the second application indicated by reference numeral <307>, the electronic device 101 may automatically complete second account information (for example, the second ID and the second password) in the account information field 300 as indicated by reference numeral <311> with reference to second reference information (for example, the second package name and the second web domain address) and provide the same to the user Meanwhile, recently, the electronic device 101 may link to social accounts of social applications separately from the account information of the application to provide the login screen. For example, when the login screen of the application is provided, the login function by the social accounts of various types of social applications (for example, Google, Facebook, Twitter, Apple, Naver, and/or Kakao) may be provided. For example, the user may execute the login function by the corresponding social account of the social application through a social login execution object 370 (for example, an application icon). However, when performing the login to the application using the social application through the account management function (for example, account automatic completion function), the electronic device 101 may recommend account information corresponding to the case in which at least one item matches with simple reference to the reference information (for example, the package name and/or the web domain address). Accordingly, when there is no matching item even though the login function (for example, the social login function) by the social account of the actual social application can be performed, recommendation by an automatic input of the account information cannot be provided or wrong account information can be recommended.

Further, since one application provides the login function through a link with various types of social accounts, the user may have difficulty in determining whether the corresponding application uses account information of the application itself or the linked social account. Even though the user uses the social account, the user may have difficulty in memorizing which type of social account is used to perform the login function among social accounts of various types of social applications.

For example, it may be assumed that A account information of an A application, B account information of a B application, and a C account information of a C application are stored in the database 200 of the electronic device 101. Further, in the case of the A application, it may be assumed that C account information (for example, social account) of a C application (for example, a social application) is connected (or the login function is configured) separately from the A account information. However, even though the user enters the login screen of the A application in the above state and assigns the focus to the account information field 300, only the account information of the A application can be provided through the current electronic device 101 or the account management function thereof. For example, information (for example, guide) indicating that the C account information (for example, social account) connected to the C application is stored is not provided in the login screen of the A application. Further, when the user configures the login function as the C account information in the A application and enters the login screen of the B application to which the C account information of the C application is not connected, the current electronic device 101 or the account management function thereof may recommend the login of the user by the C account information of the C application even though there is no connected C account information. In this case, even though the user attempts the login by the recommended C account information, the user may fail in the login of the B application and may unnecessarily repeatedly perform the login operation.

According to various embodiments of the disclosure, when the user executes an application in the electronic device 101 and attempts the login in the executed application, the electronic device 101 may operate to determine whether there is account information (for example, a social account or social account information) of at least one social application linked (or connected) to the executed application in the memory 130 (for example, the database 200).

According to various embodiments of the disclosure, when there is social accounts of at least one social application linked to the executed application, the electronic device 101 may operate to provide a login screen on the basis of first account information of the application itself and at least one piece of second account information (for example, social accounts) of at least one social application. For example, when providing the login screen of the executed application, the electronic device 101 may provide information (for example, a guide) indicating which type of social login function is used in the corresponding application by the user on the basis of account information pre-stored in the database 200 by the user.

According to various embodiments of the disclosure, when a request for an account management function is made by a user input, the electronic device 101 may provide a management screen for various pieces of account information by the user in each of the various applications (for example, including social applications). For example, the electronic device 101 may provide information indicating which application uses a social login function and which social login function is used in the application to be easily identified in the management screen.

The electronic device according to various example embodiments of the disclosure may include: a display module including a display, a memory, and a processor operatively connected to the display module and the memory. The processor may be configured to: detect a trigger for executing the login function in a first application; extract first account information used for the login function of the first application; determine whether the extracted first account information includes second account information of a second application which can be linked thereto; based on the second account information being included, the processor may be configured to provide the second application which can be used and visual objects related to the second account information in a login screen related to the first application displayed on the display module.

According to an example embodiment, the processor may be configured to: store first input account information based on a login function configuration in the first application; based on the first account information being stored, the processor may be configured to identify reference information related to the first application and map and store the input account information and the reference information.

According to an example embodiment, the reference information may include a unique value of an application for identifying the first application and a web domain address connected to a login screen of the second application.

According to an example embodiment, the unique value of the application includes a package name and/or a package signature and the web domain address includes a uniform resource identifier (URI) or a uniform resource locator (URL).

According to an example embodiment, the processor may be configured to determine whether there is the second account information from the first account information related to the first application, based on at least one specified condition, and the specified condition includes at least one determination condition for identifying the second account information.

According to an example embodiment, the processor may be configured to identify the second account information based on a first web domain address connected to a login screen related to the second application corresponding to a first unique value of an application acquired from the first application being different from a second unique value of the first application stored in the memory and a second web domain address corresponding to the second unique value.

According to an example embodiment, based on there being an item having a first unique value and a second unique value, which are identical to each other, and having no web domain address, the processor may be configured to identify account information having a web domain address as the social account information.

According to an example embodiment, the processor may be configured to, based on a first unique value and a first web domain address of an application acquired from the first application being different from a second web domain address corresponding to a second unique value corresponding to a value identical to the first unique value stored in the memory and there being a third unique value of a third application stored in the memory as the second web domain address, identify account information having the second web domain address as the second account information.

According to an example embodiment, the processor may be configured to, based on a positive response for a social account of a web domain address being received from a server through communication with the server, identify the second account information.

According to an example embodiment, the processor may be configured to provide the visual objects as a guide for the second account information in a specified area of the login screen. According to an example embodiment, the visual objects may include a guide object indicating that a social login function can be used and/or a social login execution object.

According to an example embodiment, the second account information may include one or more pieces of account information. According to an example embodiment, the processor may be configured to provide social login execution objects corresponding to a plurality of pieces of second account information to be distinguished from each other, based on priority, detect an input for the social login execution objects, and provide a login function for the first application using second account information corresponding to a social login execution object for which an input is detected, based on the detection of the input.

Hereinafter, a method of operating the electronic device 101 according to various embodiments is described. Operations performed by the electronic device 101 described below may be performed by the processor 120 including various processing circuits (various processing circuitries) of the electronic device 101 and/or executable program elements. According to an embodiment, operations performed in the electronic device 101 may be performed by instructions stored in the memory 130 and causing the processor 120 to operate when executed.

Figure 4:
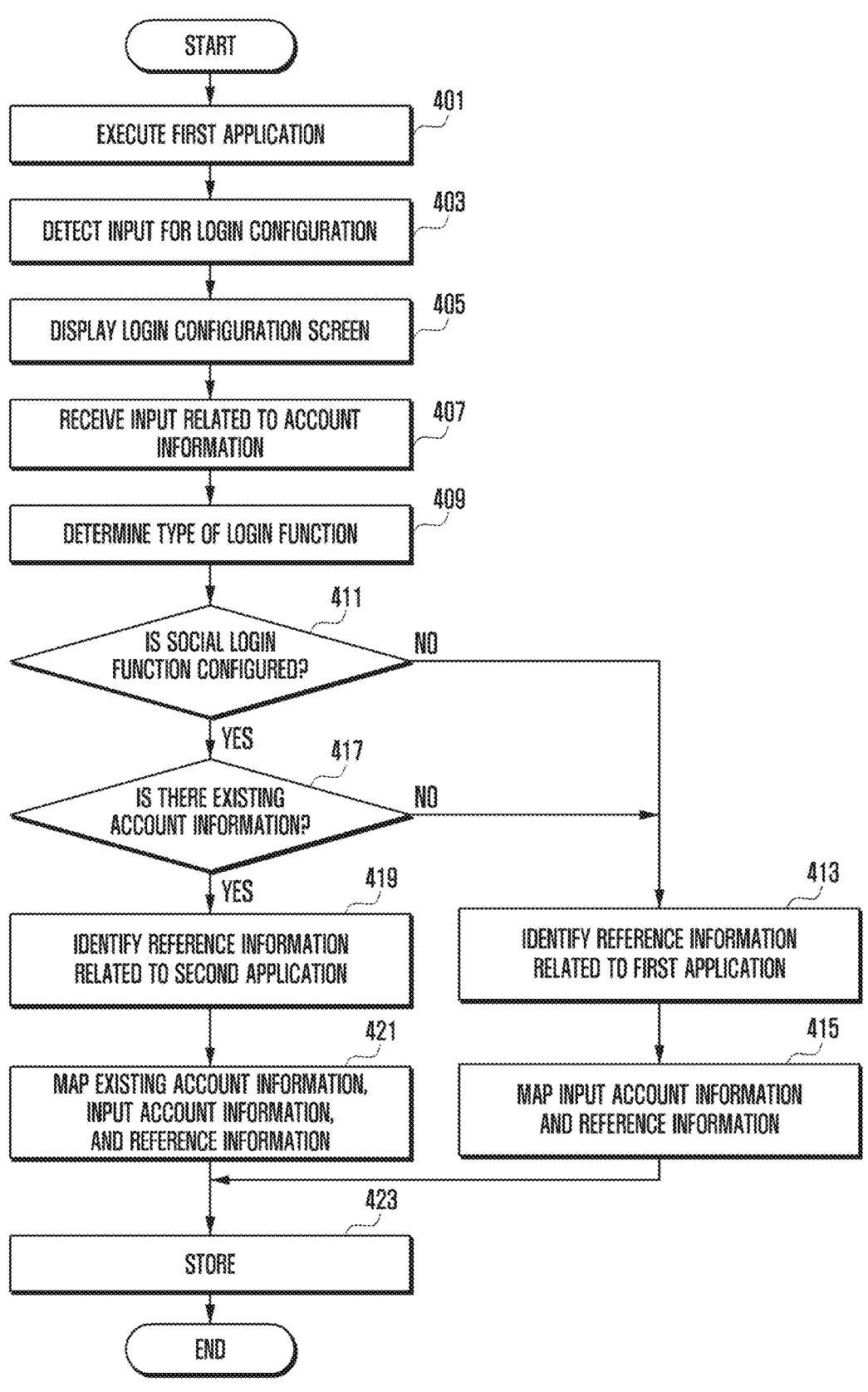
FIG. 4 is a flowchart illustrating an example method of operating an electronic device according to various embodiments.
Figure 5:
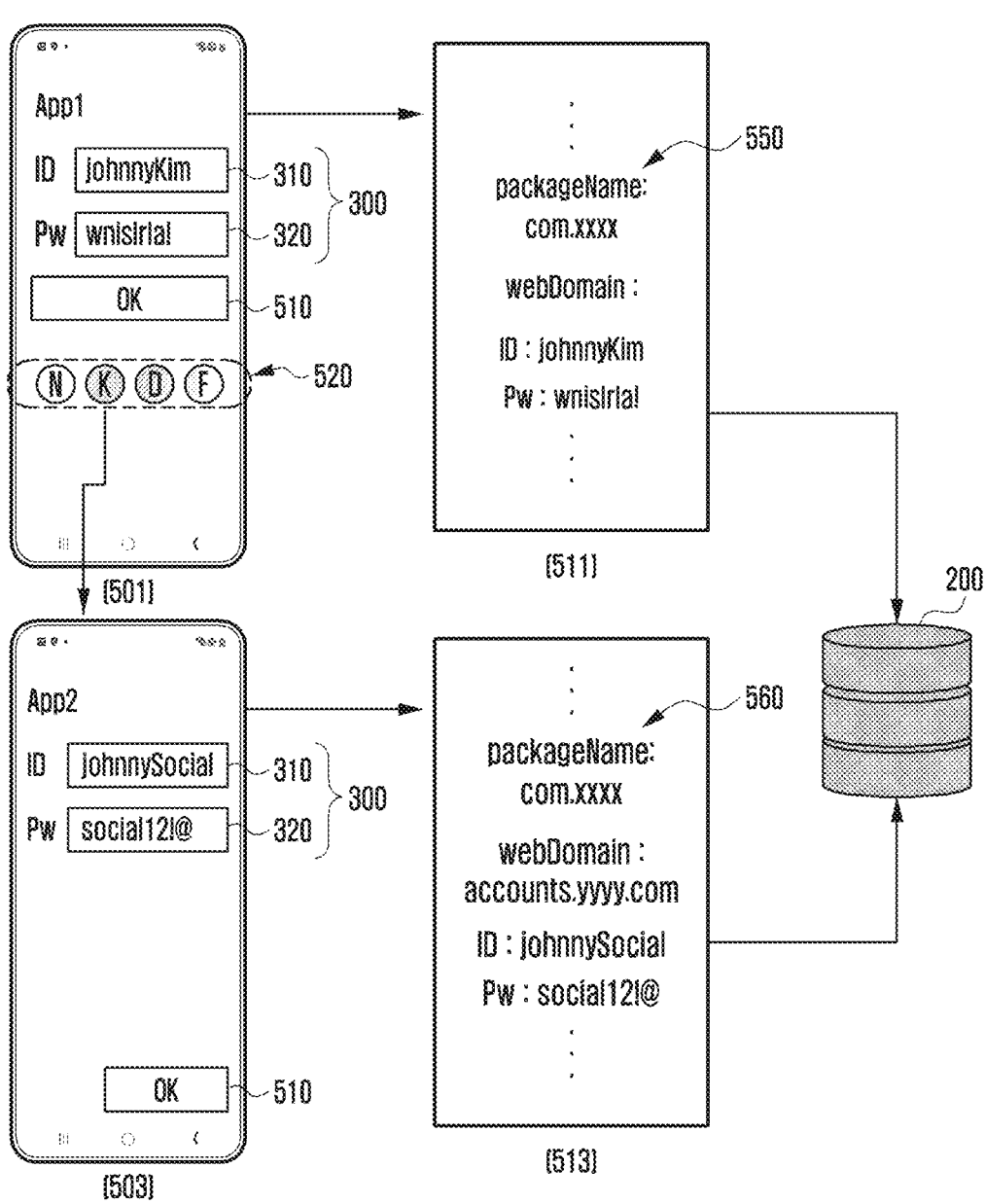
FIG. 5 is a diagram illustrating an example in which the electronic device stores account information according to various embodiments.

FIG. 4 is a flowchart illustrating an example method of operating an electronic device according to various embodiments. FIG. 5 is a diagram illustrating an example in which the electronic device stores account information according to various embodiments.

According to an embodiment, FIGS. 4 and 5 illustrate an example in which the electronic device 101 stores and manages at least one piece of account information (for example, login account information) configured for the application by the user.

Referring to FIG. 4, in operation 401, the processor 120 of the electronic device 101 may execute a first application (for example, a general application). According to an embodiment, the processor 120 may execute the first application in response to a user input for executing the first application. According to an embodiment, the processor 120 may control the display module 160 to display an execution screen of the first application on the basis of execution of the first application. In an embodiment, the execution screen of the first application may include a login screen. According to various embodiments, when displaying the execution screen of the first application, the processor 120 may operate to automatically assign the focus to the account information field 300 of the login screen (for example, automatically select (or activate) the account information field 300).

In operation 403, the processor 120 may detect an input for configuring the login. According to an embodiment, the user may make an input of controlling a menu (for example, an option menu or a setting menu) related to the login configuration for the first application in the execution screen of the first application.

In operation 405, the processor 120 may control the display module 160 to display the login configuration screen (or a login configuration page) on the basis of detection of the input for configuring the login. In an embodiment, the login configuration screen may include the account information field 300 for inputting account information (for example, an ID and a password) designated by the user. An example thereof is illustrated in FIG. 5.

Referring to FIG. 5, the login configuration screen may include and provide the account information field 300 including an ID input field 310 and a password input field 320 as indicated by reference numeral <501> or <503>. In an embodiment, the ID which can be input through the ID input field 310 may be configured in various forms of character strings designated by the user to verify the user's identity in the application. For example, the ID may be implemented in a predetermined text form (for example, combinations of letters, special characters, and/or numbers), an email form, and/or a phone number form.

In an embodiment, the login configuration screen may include an OK button 510 for completing the login configuration based on account information (for example, the ID and the password) input through the account information field 300. According to an embodiment, the login configuration screen may include an provide at least one object 520 (for example, application icon) for configuring or executing the login function by at least one second application (for example, social application) for supporting the login function through a link with the first application as indicated by reference numeral <501>. In an embodiment, the object 520 may include a predetermined icon (for example, a representative icon) for identifying a corresponding application.

In operation 407, the processor 120 may receive an input related to account information. According to an embodiment, the user may input account information (for example, the ID and the password) designated by the user in the login configuration screen and make an input for completing the login configuration. For example, the user may input the ID and the password through the ID input field 310 and the password input field 320 of the account information field

300 and make an input of selecting a predetermined button (for example, the OK button 510) to complete the login configuration.

In operation 409, the processor 120 may determine the type of a login function. According to an embodiment, the processor 120 may determine the type of the login function for the first application on the basis of detection of the input of completing the login configuration by the account information input by the user. For example, the processor 120 may determine the type of the login function requested by the user in connection with the login configuration of the first application. In an embodiment, the login function (or the login service) may include a general login function (for example, a first login function) using account information related to the first application or a social login function (for example, a second login function different from the first login function) using account information (for example, social account) related to the second application (for example, the social application) connected to the first application (for example, the general application).

In operation 411, the processor 120 may determine whether the type of the login function corresponds to a social login function configuration. For example, the processor 120 may determine whether the login configuration of the user for the first application corresponds to the general login function configuration or the social login function configuration on the basis of the result of determining the type of the login function. According to an embodiment, the processor 120 may identify the type of the login function on the basis of entry into the login configuration of the first application or entry into the login configuration by selection of the second application connected to the first application (for example, additional depth entry) during the login configuration process. An example thereof is illustrated in FIG. 5.

Referring to FIG. 5, according to an embodiment, the user may input account information designated by the user (for example, the ID and the password) in the login configuration screen of the first application, select a predetermined button (for example, the OK button 510), and complete the login configuration as indicated by reference numeral <501>. In an embodiment, when account information of the first application itself is configured without the login configuration entry of the second application (for example, the social application) (for example, without additional depth entry) which can be linked to the login function of the first application in the login configuration screen of the first application, the processor 120 may determine that the type of the login function for the first application is the general login function configuration.

According to an embodiment, from reference numeral <501> in which the login configuration screen of the first application is provided to reference numeral <503>, the user may select one object from among objects 520 (for example, application icons) for configuring the login function by the second application (for example, the social application) for the first application in the login configuration screen of the first application. In an embodiment, when a user input for selecting one object is detected in the login configuration screen of the first application, the processor 120 may provide the login configuration screen of the second application corresponding to the selected object as indicated by reference numeral <503>.

In an embodiment, when the processor 120 enters the login configuration (for example, additional depth entry) of the second application (for example, the social application) of which the login function can be linked to the first application in the login configuration screen of the first application and account information of the first application is configured through the link to the account information of the second application, the processor 120 may determine that the type of the login function for the first application is the social login function configuration.

When it is determined that the type of the login function is the general login function configuration in operation 411 (for example, "No" of operation 411), the processor 120 may identify reference information related to the first application in operation 413. In an embodiment, the reference information related to the first application may include a unique value of the first application (for example, a package name, a package signature, and/or a bundle ID) and a web domain address (or a link address) (for example, a uniform resource identifier (URI) or a uniform resource locator (URL)).

In an embodiment, the unique value of the first application may indicate information for identifying the first application. In an embodiment, the web domain address may indicate information connected to the login configuration screen of the second application (for example, the social application).

According to an embodiment, when the processor 120 can identify the type of a third party application through sharing of information between a first party (for example, a manufacturer (or producer) of the electronic device 101) application and the third party application, the reference information may include application identification information (for example, an application name (for example, appName) acquired from the third party application.

In operation 415, the processor 120 may map input account information and reference information. According to an embodiment, the processor 120 may map input account information input by the user through the account information field 300 and identified reference information to correlate each other as shown in [Table 1] or [Table 2]. For example, the processor 120 may map a package name (for example, "packageName: com.xxxx"), a web domain address (for example, "webDomain: null"), an ID (for example, "ID: johnnyKim"), and a password (for example, "PW: wnislrla!") to generate mapping information 550 as indicated by reference numeral <511> of FIG. 5.

TABLE 1

| packageName | webDomain | ID | PW |
|---|---|---|---|
| com.xxxx | null | johnnyKim | wnislrla! |

TABLE 2

| packageName | webDomain | ID | PW |
|---|---|---|---|
| com.xxxx | accounts.xxxx.com | johnnyKim | wnislrla! |

[Table 1] may indicate an example of account information (for example, an ID and a PW) of an application having no web domain address and reference information (for example, packageName and webDomain). [Table 2] may indicate an example of account information of an application having a web domain address and reference information. For example, in the case of the application, a web domain address may be or may not be included according to the form of entry into the login (configuration) screen (or page) (for example, a system view (for example, Android view or iOS view) entry or webview entry). For example, when entry into the login configuration screen through the system view is performed as shown in the example of [Table 1], the web domain address may not be included. In another example, when entry into the login configuration screen through the web view is performed as shown in the example of [Table 2], the web domain address may be included.

In operation 423, the processor 120 may store mapping information according to mapping of the input account information and the reference information. According to an embodiment, the processor 120 may store the input account information and the reference information in a predetermined area (for example, the database 200) of the memory 130 and manage the same. In an embodiment, the processor 120 may integrate (or update) new information into the existing information (or data) related to the account in the database 200.

When it is determined that the type of the login function is the social login function configuration in operation 411 (for example, "Yes" of operation 411), the processor 120 may determine whether there is the existing account information related to the first application in operation 417. According to an embodiment, the processor 120 may determine whether there is the existing account information (for example, account information of the first application itself and/or account information of the second application) previously configured for the first application in the database 200.

When there is no existing account information related to the first application in operation 417 (for example, "No" of operation 417), the processor 120 may proceed to operation 413 and perform operations after operation 413.

When there is the existing account information related to the first application in operation 417 (for example, "Yes" of operation 417), the processor 120 may identify reference information related to the second application (for example, the social application) in operation 419. In an embodiment, the reference information related to the second application may include a unique value and a web domain address of the second application.

In an embodiment, the unique value (for example, the package name) of the second application may indicate information for identifying the second application. In an embodiment, the web domain address may indicate information connected to the login configuration screen of the second application (for example, the social application). According to an embodiment, when the processor 120 can identify the type of the third party application through sharing of information between the first party application and the third party application, the reference information may include application identification information (for example, the application name (for example, appName)) acquired from the third party application.

In an embodiment, orders of operation 417 and operation 419 are not limited to the illustrated orders, and operation 417 and operation 419 may be performed sequentially, in parallel, inversely sequentially, or heuristically.

In operation 421, the processor 120 may map the existing account information, the input account information, and the reference information. According to an embodiment, the processor 120 may map the existing account information pre-stored in the database 200 in connection with the first application, the input account information input by the user through the account information field 300, and the identified reference information to correlate each other as shown in the examples of [Table 3] and [Table 4]. For example, the processor 120 may map a package name (for example, "packageName: com.xxxx"), a web domain address (for example, "webDomain: accounts.yyyy.com"), an ID (for example, "ID: johnnySocial"), and a password (for example, "PW: social12! @)") to generate mapping information 560 as indicated by reference numeral <513> of FIG. 5.

application for the social login function through separate communication with the server 600.

According to an embodiment, the electronic device 101 may store (or generate) account information by the social account of the social application in the database 200 of the electronic device 101 in the application by the user. An example thereof is as shown in [Table 5].

TABLE 5

| packageName | appName | webDomain | socialService | ID | PW |
|---|---|---|---|---|---|
| com.xxxx | App1 | null | null | johnnyKim | wnislrla! |
| com.xxxx | App1 | accounts.yyyy.com | null | johnnySocial | social12!@ |

TABLE 3

| packageName | webDomain | ID | PW |
|---|---|---|---|
| com.xxxx | null | johnnyKim | wnislrla! |

TABLE 4

| packageName | webDomain | ID | PW |
|---|---|---|---|
| com.xxxx | null | johnnyKim | wnislrla! |
| com.xxxx | accounts.yyyy.com | johnnySocial | social12!@ |

[Table 3] may indicate an example of the existing mapping information 550 including the existing account information of the application having no web domain address and reference information. [Table 4] may indicate an example of mapping the new mapping information 560 to be correlated with the existing mapping information 550. In an embodiment, the processor 120 may map the mapping information 560 based on the new account information to be correlated with the mapping information 550 based on the existing account information. For example, for the first application, the processor 120 may map the account information of the first application itself and the account information of at least one second application (for example, social application) to support the login function by two or more pieces of account information.

In operation 423, the processor 120 may store mapping information according to mapping of the existing account information, the input account information, and the reference information. According to an embodiment, the processor 120 may store the existing account information, the input account information, and the reference information in a predetermined area (for example, the database 200) of the memory 130 and manage the same. In an embodiment, the processor 120 may integrate (or update) new information into the existing information (or data) related to the account in the database 200.

Figure 6:
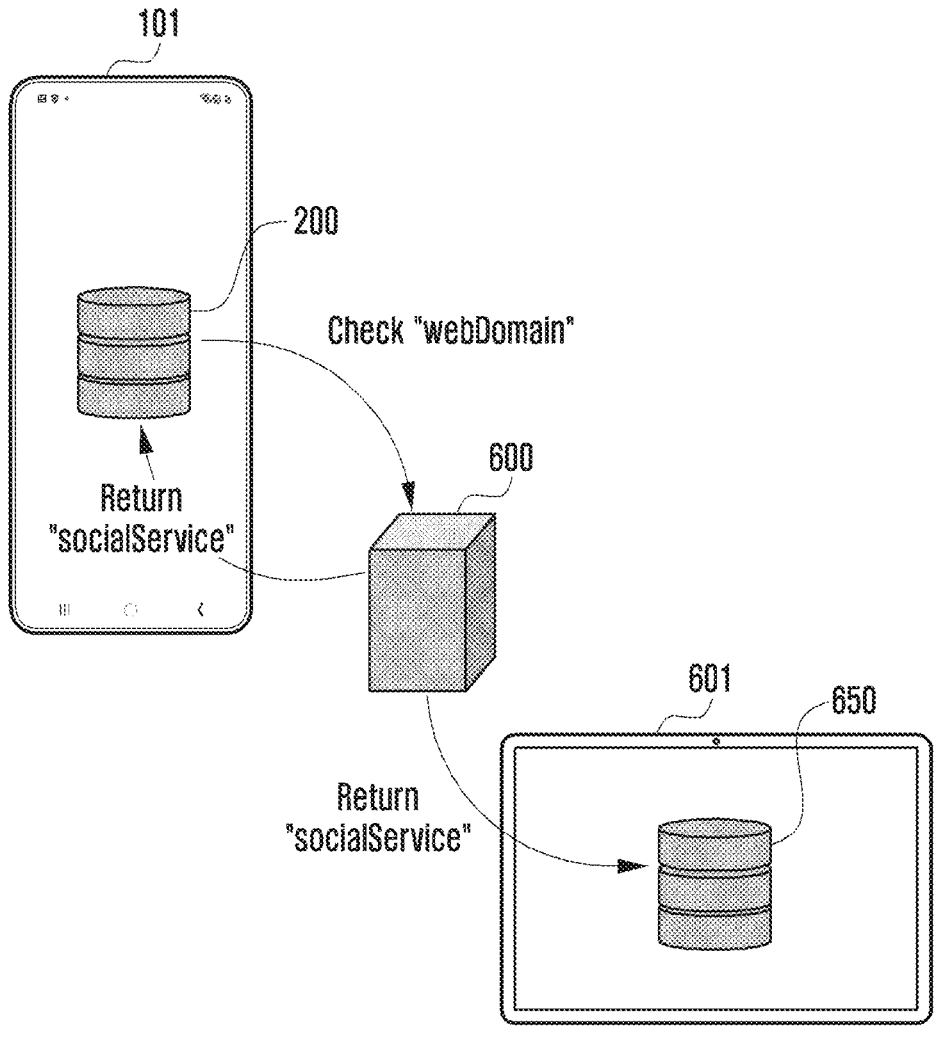
FIG. 6 is a diagram illustrating an example of storing and managing account information on the basis of a link between the electronic device and a server according to various embodiments.

FIG. 6 is a diagram illustrating an example of storing and managing account information based on a link between the electronic device and a server according to various embodiments.

As illustrated in FIG. 6, the electronic device 101 may support the login function of the application through a link with a server 600 (for example, the server 108 of FIG. 1, a cloud server, or an account management server). According to an embodiment, the electronic device 101 may separately store and manage a web domain address related to the social According to an embodiment, when a web domain address (for example, "accounts.yyyy.com") of a social application is stored in the database 200, the electronic device 101 may ask the server 600 about whether the corresponding web domain address (for example, "accounts.yyyy.com") corresponds to the social account of the social application at a designated synchronization time point with the server 600. For example, the electronic device 101 may operate to transmit the web domain address (for example, "accounts.yyyy.com") to the server 600 and make a request for identifying the social account of the web domain address.

According to an embodiment, as shown in the example of [Table 6], the server 600 may store and manage various web domain addresses and corresponding social function types related to the social applications for identifying the social applications.

TABLE 6

| webDomain | socialService |
|---|---|
| id.aaaaa.com | Aaaaa (for example: Payco) |
| m.bbbbbbb.com | Bbbbbbb (for example: Facebook) |
| nid.ccc.com | Ccc (for example: Naver) |
| accounts.yyyy.com | Yyyy (for example: Kakao) |

According to an embodiment, the server 600 may receive a request for identifying the web domain address (for example, "accounts.yyyy.com") and the social account from the electronic device 101. According to an embodiment, the server 600 may compare the data stored in the server 600 and the received web domain address (for example, "accounts.yyyy.com") as shown in the example of <Table 6> on the basis of reception of the request from the electronic device 101.

According to an embodiment, the server 600 may provide information on a social login item for the corresponding web domain address to the electronic device 101 according to whether there is the web domain address that matches the web domain address received from the store data. For example, when there is the received web domain address in the data as shown in the example of [Table 6], the server 600 may provide a positive response (for example, ACK) indicating that the corresponding web domain address is the social login item to the electronic device 101. In another example, when there is no received web domain address in the data as shown in the example of [Table 6], the server 600 may provide a negative response (for example, NACK) indicating that the corresponding web domain address is not the social login item to the electronic device 101.

According to an embodiment, when the electronic device 101 receives a response (for example, a positive response or a negative response) corresponding to a request for identifying the web domain address (for example, "accounts.yyyy.com") from the server 600, the electronic device 101 may update the database 200 of the electronic device 101 on the basis of the received response ((for example, the positive response or the negative response). An example thereof is as shown in [Table 7]. In an embodiment, [Table 7] is the case in which the positive response is received, and may indicate an example in which an additional configuration (or update) indicating that the corresponding web domain address is the social login item in [Table 5].

TABLE 7

| packageName | appName | webDomain | socialService | ID | PW |
|---|---|---|---|---|---|
| com.xxxx | App1 | null | null | johnnyKim | wnislrla! |
| com.xxxx | App1 | accounts.yyyy.com | Yyyy | johnnySocial | social12!@ |

According to an embodiment, the user may synchronize and manage a plurality of electronic devices 101 and 601 on the basis of one account. For example, the electronic device 101 and another electronic device 601 may be devices grouped by the same account of the user. In this case, the electronic device 101 and/or the server 600 may synchronize and share login information between a plurality of electronic devices on the basis of the account.

According to an embodiment, when there is data related to the web domain address received from the electronic device 101, the server 600 may also provide a positive response (for example, ACK) indicating that the corresponding web domain address is the social login item to another electronic device 601 of the same account when providing the same to the electronic device 101.

According to an embodiment, when the electronic device 101 and another electronic device 601 receive the positive response corresponding to the web domain address (for example, "accounts.yyyy.com") from the server 600, each of the database 200 of the electronic device 101 and the database 650 of another electronic device 601 may be updated on the basis of the received positive response. Accordingly, when the user uses the login function in another electronic device 601, another electronic device 601 may recommend and provide account information through the operation corresponding to the electronic device 101 on the basis of the synchronized database 650.

Figure 7:
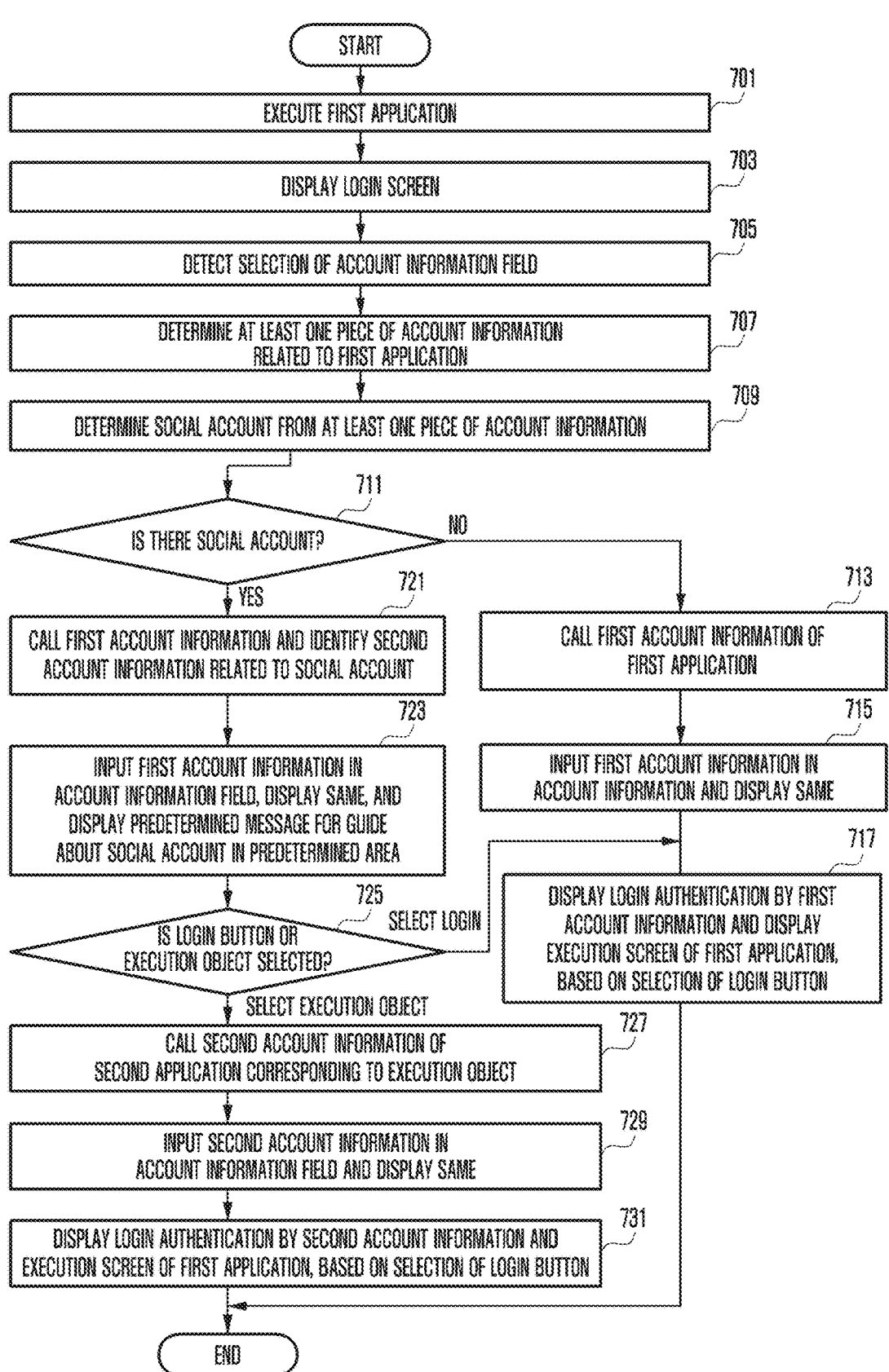
FIG. 7 is a flowchart illustrating an example method of operating the electronic device according to various embodiments.
Figure 9:
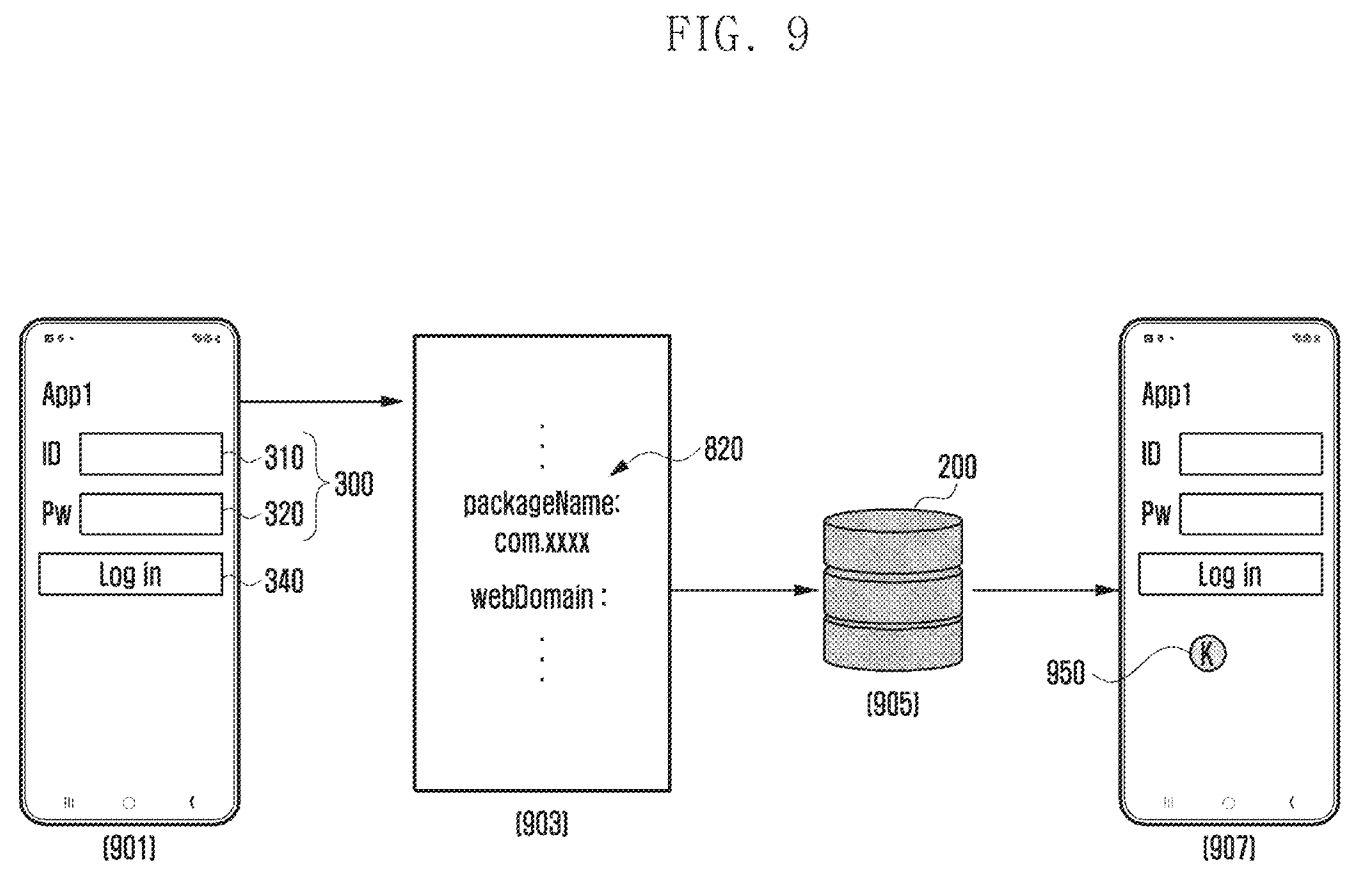

FIG. 7 is a flowchart illustrating an example method of operating an electronic device according to various embodiments. FIGS. 8 and 9 are diagrams illustrating an example in which an electronic device provides a login function according to various embodiments.

According to an embodiment, FIG. 7 illustrates an example operation in which the electronic device 101 provides a login function of an application.

Referring to FIG. 7, in operation 701, the processor 120 of the electronic device 101 may execute a first application (for example, a general application). According to an embodiment, the processor 120 may receive a user input of making a request for executing the first application from the user and execute the first application corresponding to the user input.

In operation 703, the processor 120 may display a predetermined login screen related to the first application. According to an embodiment, the processor 120 may control the display module 160 to display an execution screen of the first application on the basis of the execution of the first application.

In an embodiment, the execution screen of the first application may include a login screen. In an embodiment, the login screen may include the account information field 300 (or the login field) for inputting account information (for example, an ID and a password) designated by the user and/or at least one object (for example, social application object) which can use a login function (for example, social account login) by a second application (for example, a social application).

According to an embodiment, when displaying the execution screen of the first application, the processor 120 may operate to automatically assign the focus to the account information field 300 of the login screen (for example, automatically select (or activate) the account information field 300). An example of the login screen is illustrated in FIGS. 8 and 9.

Referring to FIGS. 8 and 9, the login screen may include and provide the account information field 300 including the ID input field 310 and the password input field 320 as indicated by reference numeral <801>. In an embodiment, the login screen may include the login button 340 for performing the login based on the account information (for example, the ID and the password) input through the account information field 300.

According to an embodiment, the login screen may include and provide at least one social login execution object 810 (for example, application icon) which can perform the login (for example, the social login function) by account information (for example, the social account) of the second application (for example, the social application) by the first application as indicated by reference numeral <801>. In an embodiment, the at least one social login execution object 810 may include a predetermined icon (for example, a representative icon) for identifying the corresponding second application.

According to an embodiment, the login screen may not include an object (for example, the social login execution object 810 of FIG. 8) for the social login function when entering the login screen as indicated by reference numeral <901> and include and provide a social login execution object (950 of FIG. 9) related to the second application identified to be used for the login function in the first application as indicated by reference numeral <907>.

In operation 705, the processor 120 may detect a user input for selecting the account information field 300. According to an embodiment, the processor 120 may detect a user input for assigning the focus to the account information field 300 (for example, selecting (for example, touching) the account information field 300) by the user.

According to an embodiment, the processor 120 may operate to automatically assigning the focus to the account information field 300 (for example, automatically selecting (or activating) the account information field 300) when entering the login screen. In an embodiment, when detecting the user input for selecting the account information field 300 or automatic selection in the login screen, the process 120 may recognize it as a trigger for executing a function (for example, an automatic completion function) of making an automatic input (or automatic completion) into the account information field 300 on the basis of account information (for example, the ID and the password) pre-stored in the database 200.

In operation 707, the processor 120 may determine at least one piece of account information related to the first application. According to an embodiment, the processor 120 may identify at least one piece of account information pre-stored to be correlated to the first application in the database 200.

In operation 709, the processor 120 may determine a social account from at least one piece of account information.

In operation 711, the processor 120 may determine whether at least one piece of account information includes the social account on the basis of the result of determining the social account.

According to an embodiment, the processor 120 may determine (or analyze) whether there is a social account which can support the social login function based on account information of the second application for the first application from at least one piece of account information related to the first application as shown in the examples of operation 709 and operation 711.

According to an embodiment, the processor 120 may operate to determine whether there is the social account from the account information related to the first application on the basis of a predetermined condition. In an embodiment, the predetermined condition may include various determination conditions for identifying the social account as described below, and the electronic device 101 may identify the social account by one or a combination of the various determination conditions. An example thereof is illustrated in FIGS. 8 and 9.

Referring to FIGS. 8 and 9, the user may assign the focus to the account information field 300 (for example, select (for example, touch) the account information field 300) in the login screen of the first application as indicated by reference numeral <801> or <901>. According to an embodiment, when the focus is assigned to the account information field 300, the processor 120 may acquire reference information 820 from the first application as indicated by reference numeral <803> or <903>. According to an embodiment, the processor 120 may identify a package name and a web domain address of the first application. For example, the processor 120 may identify the package name (for example, "packageName: com.xxxx") and the web domain address (for example, "webDomain: null") of the application.

According to an embodiment, the processor 120 may determine whether the account information of the first application includes the social account by comparing the acquired reference information 820 of the first application with the reference information (for example, the package name and the web domain address) of the first application pre-stored in the database 200 as indicated by reference numeral <805> or <905>. For example, the processor 120 may determine whether the social login can be used for the first application.

According to an embodiment, the processor 120 may compare the reference information 820 (for example, a unique value (for example, packageName) and a web domain address of the application) of the first application acquired from the first application and the reference information (for example, a unique value and a web domain address of the same application) of the same first application pre-stored in the database 200. According to an embodiment, when the reference information is different from the web domain address (for example, webDomain) corresponding to the unique value (for example, the package name) of the same first application stored in the database 200 on the basis of the comparison result (for example, see [Table 4]), the processor 120 may determine that the social login function of the first application can be used by the social account.

For example, in the cases in which the user performs the login on the basis of account information of the application itself and the user performs the login on the basis of account information of the social account for one application, the database 200 may have items containing the same package name but different web domain addresses. According to an embodiment, when there are items having the same package name but having no web domain address, the processor 120 may determine that the remaining items (for example, account information) having the web domain address as the social account.

According to an embodiment, when the reference information 820 (for example, the unique value and the web domain address of the application) of the first application acquired from the first application is different from a web domain address corresponding to the same unique value (for example, package name) stored in the database 200 in the login screen and there is another unique value (for example, package name) item stored as the same web domain address in the database 200 (for example, see [Table 8] below), the processor 120 may determine that the social login function of the first application can be used by the social account.

For example, as shown in the example of [Table 8], the database 200 may have items containing the same package name and different web domain address in the case in which the user performs the login with account information of the application itself and the case in which the user performs the login with account information of the social account. According to an embodiment, when the package names are the same, each the package names has a web domain address, and the web domain addresses are different, the processor 120 may identify the web domain address of the social account with reference to another application (for example, a third application different from the first and second applications) among the items stored in the database 200.

According to an embodiment, when there is at least one item having the same web domain address but different package names as shown in the example of [Table 8] among the items stored in the database 200, the processor 120 may determine that the corresponding web domain address is a web domain address corresponding to the social account login screen.

TABLE 8

| packageName | appName | webDomain | ID | PW |
|---|---|---|---|---|
| com.xxxx | App1 | accounts.xxxx.com | johnnyKim | wnislrla! |
| com.xxxx | App1 | accounts.yyyy.com | johnnySocial | social12!@ |
| com.zzzz.bbb | App2 | accounts.yyyy.com | johnnySocial | social12!@ |

According to an embodiment, the processor 120 may communicate with a separate server (for example, a cloud server) to separately manage a web domain address for a social login function and, when reference information 820 (for example, a unique value and a web domain address of the application) of the first application is acquired in the login screen, may determine that the social login function of the first application can be used by the social account if a positive response for the social account of the corresponding web domain address is received from the server 200.

Referring back to FIG. 7, when the social account related to the first application is not included in operation 711 (for example, "No" of operation 711), the processor 120 may call first account information (for example, account information of the application itself) of the first application in operation 713. For example, when there is no social account related to the first application in the database 200, the processor 120 may determine the login function using the account information of the application itself for the first application and call the first account information configured for the first application from the database 200.

In operation 715, the processor 120 may input the first account information into the account information field 300 and display the same. According to an embodiment, the processor 120 may operate to display the login screen including the account information field 300 on the basis of the first account information (for example, a first ID and a first password). For example, the processor 120 may automatically input (or automatically complete) the first account information pre-stored in the database 200 into the account information field 300 by the account management function and provide the same to the user.

In operation 717, the processor 120 may display login authentication by the first account information and an execution screen of the first application on the basis of selection of the login button 340. According to an embodiment, the processor 120 may operate to detect a user input of selecting (for example, touching) the login button 340 from the user in the login screen on which the first account information is input into the account information field 300 and display the login authentication of the first account information and the execution screen of the first application in response to the user input.

When the social account related to the first application is included in operation 711 (for example, "Yes" of operation 711), the processor 120 may call the first account information of the first application (for example, account information of the application itself) and identify second account information related to at least one social account in operation 721.

For example, when there are first account information and second account information related to the first application in the database 200, the processor 120 may determine that a login function (for example, a first login function) using account information of the application itself for the first application and a login function (for example, the social login function) (for example, a second login function) using account information by the social account of the second application (for example, the social application) be used. According to an embodiment, when it is determined that the first login function and the second login function can be used, the processor 120 may call the first account information and the second account information configured for the first application from the database 200.

According to an embodiment, the first account information related to the first application may not exist. For example, the user may configure the login function using only the second account information of the social account for the first application. In this case, the processor 120 may determine the login function (for example, the social login function) using the account information by the social account of the second application (for example, the social application).

In operation 723, the processor 120 may input the first account information into the account information field 300, display the same, and display a predetermined message (for example, a guide message or a toast message) as a guide for the social account in a predetermined area. According to an embodiment, the processor 120 may operate to provide the user with a notification (for example, a visual object) indicating that the account information field 300 is configured on the basis of the first account information (for example, the first ID and the first password) and the login function using the account information by the social account of the second application can be used through a predetermined area.

For example, the processor 120 may automatically input (or automatically complete) the first account information pre-stored in the database 200 into the account information field 300 and provide the user with a guide for the social login function through a predetermined object related to the second account information. According to various embodiments, when the first account information does not exist as illustrated in operation 721, the processor 120 may remain the account information field 300 blank and provide the user with the guide for the social login function through the predetermined object related to the second account information. According to an embodiment, the provision of the guide for the social login function through the predetermined object is illustrated with reference to FIGS. 8 and 9.

Referring to FIGS. 8 and 9, as indicated by reference numeral <807> or <907>, it is possible to automatically input the first account information into the account information field 300 in the login screen of the first application, display the same, and provide the guide about the social login function.

According to an embodiment, the login screen may include various visual objects for the guide about the second account information in the predetermined area as indicated by reference numeral <807>. According to an embodiment, various visual objects may include a guide object 850 (for example, a guide message or a toast message) indicating that the login (for example, the social login function) by the account information (for example, the social account) of the second application (for example, the social application) can be used in the first application. According to an embodiment, the login screen may include at least one social login execution object 810 (or login function switching object) for performing the login by the account information of the second application as various visual objects.

According to an embodiment, the second account information may include one or more pieces of account information, and the processor 120 may provide the social login execution objects 810 such that at least one social login execution object 810 corresponding to a plurality of pieces of second account information are highlighted and distinguished. According to an embodiment, when providing the social login execution objects 810, the processor 120 may provide the social login execution objects 810 such that the social login execution objects 810 have a predetermined order on the basis of priority (for example, the frequency of use) of the second account information.

According to an embodiment, when the objects (for example, the social login execution objects 810 of FIG. 8)

for the social login function are not included during entry into the login screen as indicated by reference numeral <901>, a social login execution object 950 related to the second application (that is, the second account information) identified to be available for the login function in the first application may be included and provided as indicated by reference numeral <907>. According to various embodiments, even when at least one social login execution object 950 corresponding to the second account information is provided as indicated by reference numeral <901>, the guide objects 850 corresponding to the second account information may also be provided.

The processor 120 may determine whether the current login screen including the social account related to the first application is the login screen of the application itself or the social account login screen and, when the current login screen is not the social account login screen, provide a guide about the social login function as indicated by reference numeral <807> or <907>.

In operation 725, the processor 120 may determine whether there is selection of the login button 340 or the execution object 810 or 950 in operation 725.

When the processor 120 detects a user input by the login button 340 in operation 725, the processor 120 may proceed to operation 717 and operate to perform operations after operation 717. For example, the processor 120 may display login authentication by the first account information and an execution screen of the first application on the basis of the selection of the login button 340.

When the processor 120 detects a user input by the execution object 810 or 950, the processor 120 may call second account information of the first application (for example, account information of the second application) in operation 727. For example, when there is the social account related to the first application in the database 200, the processor 120 may determine the login function using the second account information of the second application for the first application and call the second account information of the second application configured for the first application from the database 200.

According to an embodiment, the processor 120 may include an operation of switching the login screen on the basis of detection of the user input by the execution object 810 or 950. For example, the processor 120 may switch the login screen of the first application itself to the social login screen of the second application. According to an embodiment, the login screen switching operation and the second account information calling operation may be performed in parallel, sequentially, or heuristically.

In operation 729, the processor 120 may input the second account information into the account information field 300 and display the same. According to an embodiment, the processor 120 may operate to display the login screen including the account information field 300 on the basis of the second account information (for example, a second ID and a second password). For example, the processor 120 may automatically input (or automatically complete) the second account information pre-stored in the database 200 into the account information field 300 by the account management function and provide the same to the user.

In operation 731, the processor 120 may display login authentication by the second account information and an execution screen of the first application on the basis of selection of the login button 340. According to an embodiment, the processor 120 may operate to detect a user input of selecting (for example, touching) the login button 340 from the user in the login screen on which the second account information is input into the account information field 300 and display the login authentication of the second account information and the execution screen of the first application in response to the user input.

Figure 10A:
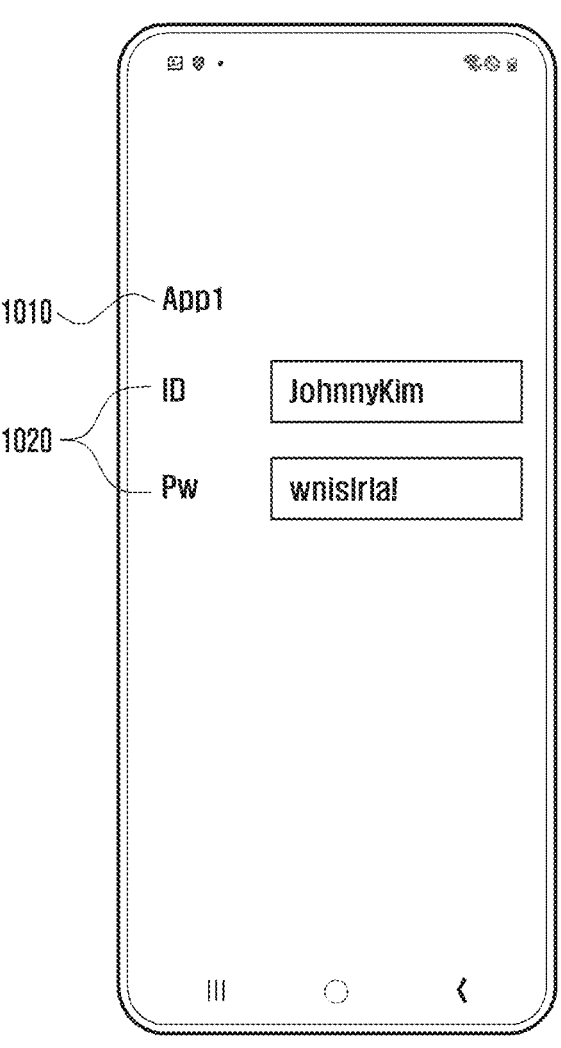
FIG. 10A, FIG. 10B, and FIG. 10C are diagrams illustrating examples of managing and providing account information in the electronic device according to various embodiments.
Figure 10B:
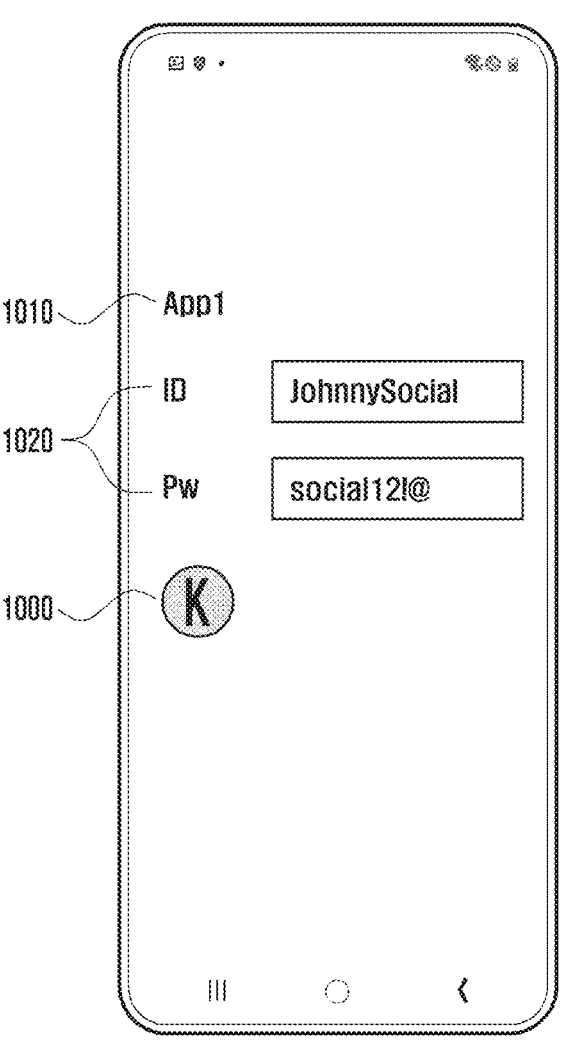
Figure 10C:
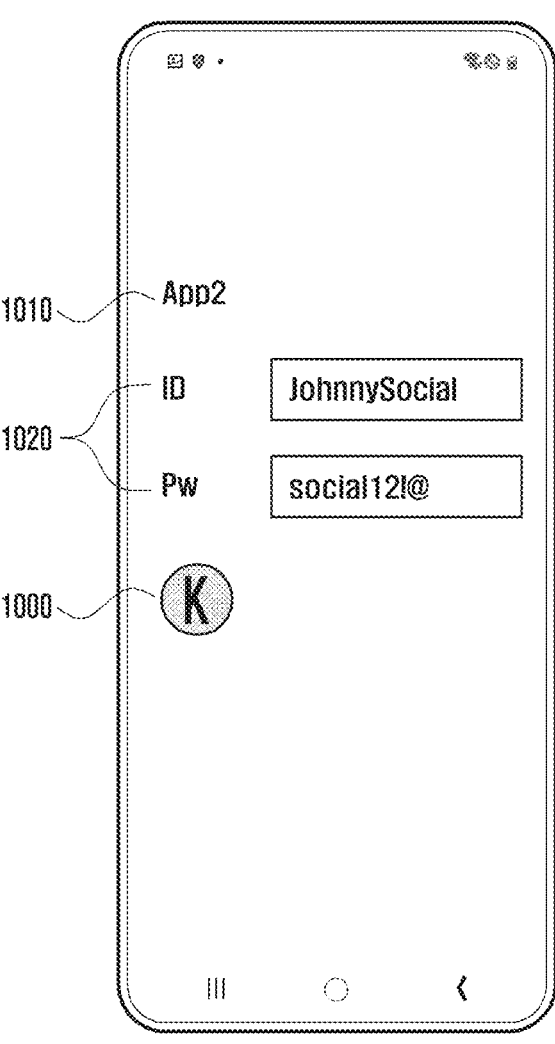

FIG. 10A, FIG. 10B, and FIG. 10C are diagrams illustrating examples of managing and providing account information in the electronic device according to various embodiments.

In an embodiment, FIG. 10A, FIG. 10B, and FIG. 10C illustrate examples of providing account information on the basis of applications.

Referring to FIG. 10A, FIG. 10A may illustrate an example of the case in which only account information of an application itself is included for the application. For example, the case may correspond to the case in which the user configures a login function as account information of the application itself for the application. As illustrated in FIG. 10A, the account management screen according to the account management function may include an application information field 1010 (for example, an App name field) for identifying the application type and an account information field 1020 (for example, an ID field and a password field).

Referring to FIGS. 10B and 10C, FIGS. 10B and 10C may illustrate the example of the case in which a social account of the social application is included for the application. For example, the case may correspond to the case in which the user configures the social login function as account information of the social account for the application.

As illustrated in FIGS. 10B and 10C, the account management screen according to the account management function may include the application information field 1010, the account information field 1020, and a social account object 1000 indicating that the account information configured for the application is account information of the social application and identifying the type of the social application. In an embodiment, the social account object 1000 may be provided as a predetermined icon (for example, a representative icon) for identifying a corresponding social application.

According to an embodiment, as illustrated in FIGS. 10B and 10C, FIGS. 10B and 10C may illustrate an example in which the social login function by the same social account can be configured in different applications.

As illustrated in FIGS. 10A, 10B, and 10C, when a request for an inquiry about account information stored in the database 200 is made by the user, the electronic device 101 may provide information (for example, a representative icon) on the configuration of the social login function and allow the user to intuitively recognize the type of the login function.

Figure 11:
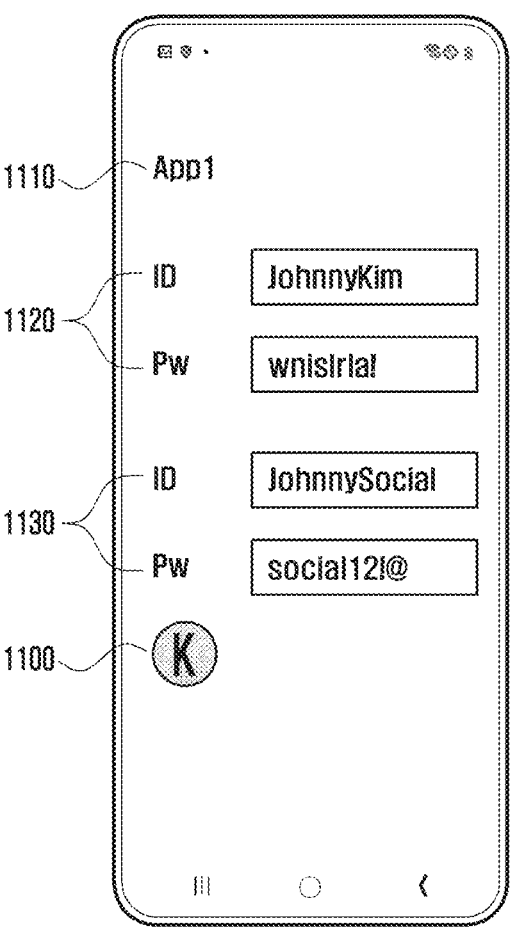
FIG. 11 is a diagram illustrating an example of managing and providing account information in the electronic device according to various embodiments.

FIG. 11 is a diagram illustrating an example of managing and providing account information in the electronic device according to various embodiments.

In an embodiment, FIG. 11 may illustrate an example of providing account information on the basis of an application.

Referring to FIG. 11, FIG. 11 may illustrate an example of the case in which account information of the application itself and a plurality of pieces of account information such as social accounts are included for the application. For example, the case may correspond to the case in which the user configures the login function by account information of the application itself and account information of the social account for the application.

As illustrated in FIG. 11, the account management screen according to the account management function may include an application information field 1110 (for example, an App name field) for identifying the application type and a plurality of account information fields 1120 and 1130 (for example, an ID field and a password field) corresponding to the plurality of pieces of account information.

In an embodiment, at least one of the plurality of pieces of account information may include a social account of a social application for the corresponding application. In this case, the corresponding account information (for example, the second account information) is account information of the social application and may include the social account object 1100 for identifying the type of the social application. In an embodiment, the social account object 1100 may be provided as a predetermined icon (for example, a representative icon) for identifying a corresponding social application.

According to an embodiment, when a plurality of pieces of account information (for example, account information of the application itself and at least one piece of social account information) are configured for the application, account information may be listed and provided within the account management screen of the application.

Figure 12:
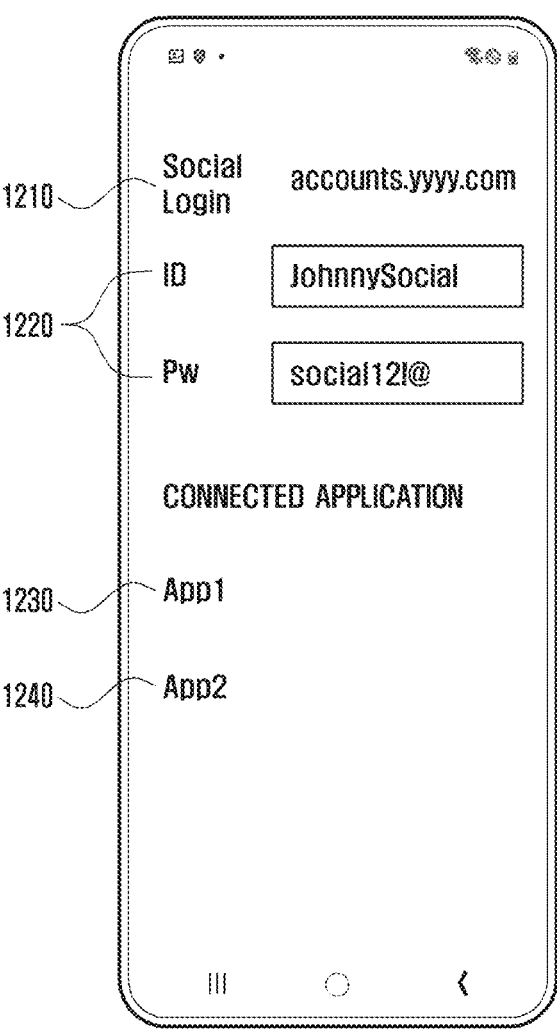
FIG. 12 is a diagram illustrating an example of managing and providing account information in the electronic device according to various embodiments.

FIG. 12 is a diagram illustrating an example of managing and providing account information in the electronic device according to various embodiments.

In an embodiment, FIG. 12 may illustrate an example of providing application information using the same social account on the basis of the social account.

Referring to FIG. 12, FIG. 12 may illustrate an example of the case in which the same social account is included for a plurality of applications. For example, the case may correspond to the case in which the user configures the login function by account information of the same social account for different applications.

As illustrated in FIG. 12, the account management screen according to the account management function may include a login information field 1210 (for example, a social login field) for identifying the type of the social login function by the social application, an account information field 1220 (for example, an ID field and a password field), and a plurality of application information fields 1230 and 1240 (for example, app name fields) corresponding to a plurality of applications using account information of the same social account.

According to an embodiment, in the case of social accounts configured for the plurality of applications, web domain addresses may be the same, and accordingly, the plurality of applications using the same social account may be provided as one group and application information connected to the corresponding social account may be listed and provided.

A method of operating the electronic device according to various example embodiments of the disclosure may include: detecting a trigger for executing a login function in a first application, extracting first account information used for the login function of the first application, determining whether the extracted first account information includes second account information of a second application which can be linked thereto, and, based on the second account information being included, providing the second application which can be used and visual objects related to the second account information in a login screen related to the first application displayed on a display module.

According to an example embodiment, the method may include storing input account information, based on a login function configuration in the first application.

According to an example embodiment, the storing may include identifying reference information related to the first application based on the account information being stored and mapping the input account information and the reference information.

According to an example embodiment, the reference information may include a unique value of an application for identifying the first application and a web domain address connected to a login screen of the second application, the unique value of the application includes a package name and/or a package signature, and the web domain address includes a uniform resource identifier (URI) or a uniform resource locator (URL).

According to an example embodiment, the determining whether the second account information is included may include determining whether there is the second account information from the first account information related to the first application, based on at least one specified condition, and the specified condition may include at least one determination condition for identifying the second account information.

According to an example embodiment, the determining whether the second account information is included may include identifying the second account information based on a first web domain address connected to a login screen related to the second application corresponding to a first unique value of an application acquired from the first application being different from a second web domain address corresponding to a second unique value of the first application stored in a memory.

According to an example embodiment, the determining whether the second account information is included may include identifying account information having the second web domain address as the second account information based on a first unique value and a first web domain address of an application acquired from the first application being different from a second web domain address corresponding to a second unique value corresponding to a value identical to the first unique value stored in the memory and there being a third unique value of a third application stored in the memory as the second web domain address According to an example embodiment, the determining whether the second account information is included may include identifying the second account information based on a positive response for a social account of a web domain address being received from the server through communication with the server.

According to an example embodiment, the providing the second account information may include providing the visual objects for a guide about the second account information in a specified area of the login screen, based on priority, detecting an input for the visual objects, and providing a login function for the first application using account information corresponding to a visual object for which an input is detected, based on the detection of the input. According to an example embodiment, the visual objects may include a guide object indicating that a social login function can be used and/or a social login execution object.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a display;

at least one processor, comprising processing circuitry, operatively connected to the display; and memory storing instructions that, when executed by the at least one processor, cause the electronic device to:

execute a first application, identify first account information stored in the memory for logging into the first application, determine whether the identified first account information is associated with second account information of a second application, wherein the second account information is usable for logging into the first application, based on determining that the first account information is not associated with second account information of a second application, display one or more fields including the first account information on a login screen related to the first application displayed on the display and in response to a user input, log into the first application using the first account information, based on determining that the first account information is associated with second account information of a second application, display one or more fields including the first account information on the login screen related to the first application and display one or more visual objects related to the second account information in the login screen related to the first application, each of the one or more visual objects being actuatable for providing login information for the login screen related to the first application based on corresponding second account information, and based on detecting a selection of one of the one or more visual objects, log into the first application using the second account information.

2. The electronic device of claim 1, wherein the instructions, when executed by the at least one processor, cause the electronic device to:

store input account information, based on a login function configuration in the first application, and based on the input account information being stored, identify reference information related to the first application and map and store the input account information and the reference information.

3. The electronic device of claim 2, wherein the reference information comprises a unique value of the first application and a web domain address corresponding to a login screen of the second application, wherein the unique value comprises at least one of a package name or a package signature, and wherein the web domain address comprises a uniform resource identifier (URI) or a uniform resource locator (URL).

4. The electronic device of claim 1, wherein the instructions, when executed by the at least one processor, cause the electronic device to determine whether the first account information is associated with the second account information, based on at least one specified condition, wherein the specified condition comprises at least one determination condition for identifying the second account information.

5. The electronic device of claim 4, wherein the instructions, when executed by the at least one processor, cause the electronic device to identify the second account information based on a first web domain address corresponding to a login screen of the second application corresponding to a first unique value of the first application being different from a second web domain address corresponding to a second unique value of the first application stored in the memory.

6. The electronic device of claim 5, wherein the instructions, when executed by the at least one processor, cause the electronic device to, based on identifying an item having the first unique value and the second unique value, which are identical to each other, and having no web domain address, identify account information having a web domain address as the second account information.

7. The electronic device of claim 4, wherein the instructions, when executed by the at least one processor, cause the electronic device to, based on a first unique value and a first web domain address acquired from the first application being different from a second web domain address corresponding to a second unique value corresponding to a value identical to the first unique value stored in the memory and based on a third unique value of a third application being stored in the memory as the second web domain address, identify account information having the second web domain address as the second account information.

8. The electronic device of claim 4, wherein the instructions, when executed by the at least one processor, cause the electronic device to, based on a positive response for a social account of a web domain address being received from a server through communication with the server, identify the second account information.

9. The electronic device of claim 1, wherein at least one of the one or more the visual objects provides guidance about the second account information.

10. The electronic device of claim 9, wherein the second account information comprises one or more pieces of account information and each visual object corresponds to a respective one of the second account information pieces, and wherein the instructions, when executed by the at least one processor, cause the electronic device to:

provide the visual objects to be distinguished from each other, based on priority associated with the corresponding second account information piece, detect an input for a selected one of the visual objects, and provide login information for the first application using the second account information piece corresponding to the selected visual object.

11. A method of operating an electronic device, the method comprising:

executing a first application;

identifying first account information stored in memory for logging into the first application;

determining whether the identified first account information is associated with second account information of a second application, wherein the second account information is usable for logging into the first application;

based on determining that the first account information is not associated with second account information of a second application, displaying one or more fields including the first account information on a login screen related to the first application displayed on the display and in response to a user input, logging into the first application using the first account information;

based on determining that the first account information is associated with second account information of a second application, displaying one or more fields including the first account information on the login screen related to the first application and displaying one or more visual objects related to the second account information in the login screen related to the first application, each of the one or more visual objects being actuatable for providing login information for the login screen related to the first application based on corresponding second account information; and based on detecting a selection of one of the one or more visual objects, logging into the first application using the second account information.

12. The method of claim 11, further comprising:

storing input account information, based on a login function configuration in the first application.

13. The method of claim 12, further comprising:

identifying reference information related to the first application based on the account information being stored and mapping the input account information and the reference information.

14. The method of claim 13, wherein the reference information comprises a unique value of the first application and a web domain address corresponding to a login screen of the second application, wherein the unique value comprises at least one of a package name or a package signature, and wherein the web domain address comprises a uniform resource identifier (URI) or a uniform resource locator (URL).

15. The method of claim 11, further comprising determining whether the first account information is associated with the second account information, based on at least one specified condition, and wherein the specified condition comprises at least one determination condition for identifying the second account information.

16. The method of claim 15, further comprising:

identifying the second account information based on a first web domain address corresponding to a login screen of the second application corresponding to a first unique value of the first application being different from a second web domain address corresponding to a second unique value of the first application stored in a memory.

17. The method of claim 15, further comprising:

identifying account information having a web domain address as the second account information based on a first unique value and a first web domain address of the first application being different from a second web domain address corresponding to a second unique value corresponding to a value identical to the first unique value stored in the memory and based on a third unique value of a third application being stored in the memory as the second web domain address.

18. The method of claim 15, further comprising:

identifying the second account information based on a positive response for a social account of a web domain address being received from a server through communication with the server.

19. The method of claim 11, wherein at least one of the one or more visual objects provides guidance about the second account information.

* * * * *